(12) United States Patent
Kolesov et al.

(10) Patent No.: US 10,841,486 B2
(45) Date of Patent: Nov. 17, 2020

(54) AUGMENTED REALITY FOR THREE-DIMENSIONAL MODEL RECONSTRUCTION

(71) Applicant: Eclo, Inc., Mountain View, CA (US)

(72) Inventors: Ivan Kolesov, Mountain View, CA (US); Alex Villanueva, Mountain View, CA (US); Liangjia Zhu, Menlo Park, CA (US)

(73) Assignee: ECLO, Inc., Mountain View, CA (US)

( * ) Notice: Subject to any disclaimer, the term of this patent is extended or adjusted under 35 U.S.C. 154(b) by 0 days.

(21) Appl. No.: 15/655,630

(22) Filed: Jul. 20, 2017

(65) Prior Publication Data

US 2019/0028637 A1 Jan. 24, 2019

(51) Int. Cl.
| | | |
|---|---|---|
| H04N 5/00 | (2011.01) | |
| H04N 5/232 | (2006.01) | |
| G06T 7/73 | (2017.01) | |
| G06F 3/01 | (2006.01) | |
| G06T 17/00 | (2006.01) | |
| G06K 9/00 | (2006.01) | |
| G06K 9/32 | (2006.01) | |
| G06T 17/20 | (2006.01) | |

(52) U.S. Cl.
CPC ......... *H04N 5/23222* (2013.01); *G06F 3/011* (2013.01); *G06K 9/00671* (2013.01); *G06K 9/32* (2013.01); *G06T 7/73* (2017.01); *G06T 17/00* (2013.01); *G06T 17/20* (2013.01); *H04N 5/23293* (2013.01); *G06T 2200/24* (2013.01); *G06T 2207/30244* (2013.01)

(58) Field of Classification Search
CPC ... G06K 9/32; G06K 9/00; G06K 9/36; G06F 17/30265; H04N 1/3876; H04N 9/8205; H04N 21/84; H04N 21/4788; H04N 5/781; H04N 2201/3214; H04N 2201/3215; H04N 2201/3253; H04N 7/00; H04N 5/23238; G06T 11/00; G03B 37/04; G09G 5/00
See application file for complete search history.

(56) References Cited

U.S. PATENT DOCUMENTS

| | | | | |
|---|---|---|---|---|
| 5,819,016 | A * | 10/1998 | Watanabe | G01B 11/002 |
| | | | | 345/419 |
| 8,059,889 | B2 * | 11/2011 | Kobayashi | G06K 9/209 |
| | | | | 348/135 |
| 8,416,236 | B1 * | 4/2013 | Hickman | G06T 19/20 |
| | | | | 345/419 |

(Continued)

*Primary Examiner* — Frank F Huang
(74) *Attorney, Agent, or Firm* — James E. Eakin

(57) ABSTRACT

Systems, devices, media, and methods are presented for object modeling using augmented reality. An object modeling mode for generating three-dimensional models of objects is initiated by one or more processors of a device. The processors of the device detect an object within a field of view. Based on a position of the object, the processors select a set of movements forming a path for the device relative to the object and cause presentation of at least one of the movements. The processors detect a set of object surfaces as portions of the object are positioned in the field of view. In response to detecting at least a portion of the object surface, the processors modify a graphical depiction of a portion of the object. The processors then construct a three-dimensional model of the object from the set of images, depth measurements, and IMU readings collected during the reconstruction process.

20 Claims, 22 Drawing Sheets

(56) References Cited

U.S. PATENT DOCUMENTS

| | | | |
|---|---|---|---|
| 8,818,081 B1* | 8/2014 | Lookingbill | G06T 19/00 |
| | | | 382/154 |
| 8,849,620 B2* | 9/2014 | Regan | G06F 17/50 |
| | | | 703/1 |
| 9,094,670 B1* | 7/2015 | Furio | H04N 13/0221 |
| 2011/0227924 A1* | 9/2011 | Nakajima | G06T 17/00 |
| | | | 345/427 |
| 2012/0281873 A1* | 11/2012 | Brown | G06T 19/006 |
| | | | 382/103 |
| 2013/0136341 A1* | 5/2013 | Yamamoto | G06T 17/00 |
| | | | 382/154 |
| 2013/0194392 A1* | 8/2013 | Qi | H04N 13/207 |
| | | | 348/50 |
| 2013/0342533 A1* | 12/2013 | Bell | G06T 19/003 |
| | | | 345/420 |
| 2014/0247325 A1* | 9/2014 | Wu | H04N 5/23206 |
| | | | 348/39 |

* cited by examiner

AUGMENTED REALITY FOR THREE-DIMENSIONAL MODEL RECONSTRUCTION

TECHNICAL FIELD

Embodiments of the present disclosure relate generally to generating three-dimensional models of real world objects. More particularly, but not by way of limitation, the present disclosure addresses systems and methods for building an interactive augmented reality interface during a process of generating a three-dimensional model.

BACKGROUND

Three-dimensional modeling systems can generate a model of an object using scanning devices. These devices can be categorized into contact, ones that use a probe to trace a surface, and non-contact scanners, which use electromagnetic radiation (e.g., visible light, x-ray) or sound (e.g., ultrasound) to sense an object's geometry. Active, non-contact scanners such as laser scanners are often limited based on availability and price due to the presence of specialized hardware to emit the signals. Further, such scanning devices are often restricted in their application due to their size, power, and integration requirements. These constraints provide technical limitations preventing distribution or use of such modeling systems by users without appropriate resources, training, and hardware.

Passive, non-contact scanners use cameras to capture reflected light by taking images of the object from multiple angles and generating a three-dimensional model based on the captured images. Often, these reconstruction techniques rely on specialized and predetermined visual patterns being present in a scene depicted in the captured images. For example, image-based reconstruction techniques may rely on a predetermined background with a specified pattern of markers, tick marks, grids, or other shapes having known dimensions to generate a three-dimensional model of an object. By way of another example, the specified patterns may be placed on the object or in a reference object positioned proximate to the object being reconstructed. As in the former example, techniques relying on patterned coverings or reference objects use known dimensions of the patterned markers for reconstruction.

Reliance on predetermined backgrounds, coverings, or reference objects with dimensionally restricted patterns limits the applications and distribution of such image-based scanning techniques. Manipulation or damage to the background, covering, or reference object or to the patterned markers prevent these image-based scanning techniques from accurately generating three-dimensional models. Further, image-based scanning techniques using patterned markers employ setup and distribution constraints since the models may not be generated without the markers. Accordingly, there is still a need in the art to improve three-dimensional modeling and scanning systems and techniques by increasing accuracy, addressing technical limitations, lowering the price for more ready availability, and reducing the amount of training required for operation.

BRIEF DESCRIPTION OF THE DRAWINGS

Various ones of the appended drawings merely illustrate example embodiments of the present disclosure and should not be considered as limiting its scope.

Figure 1:
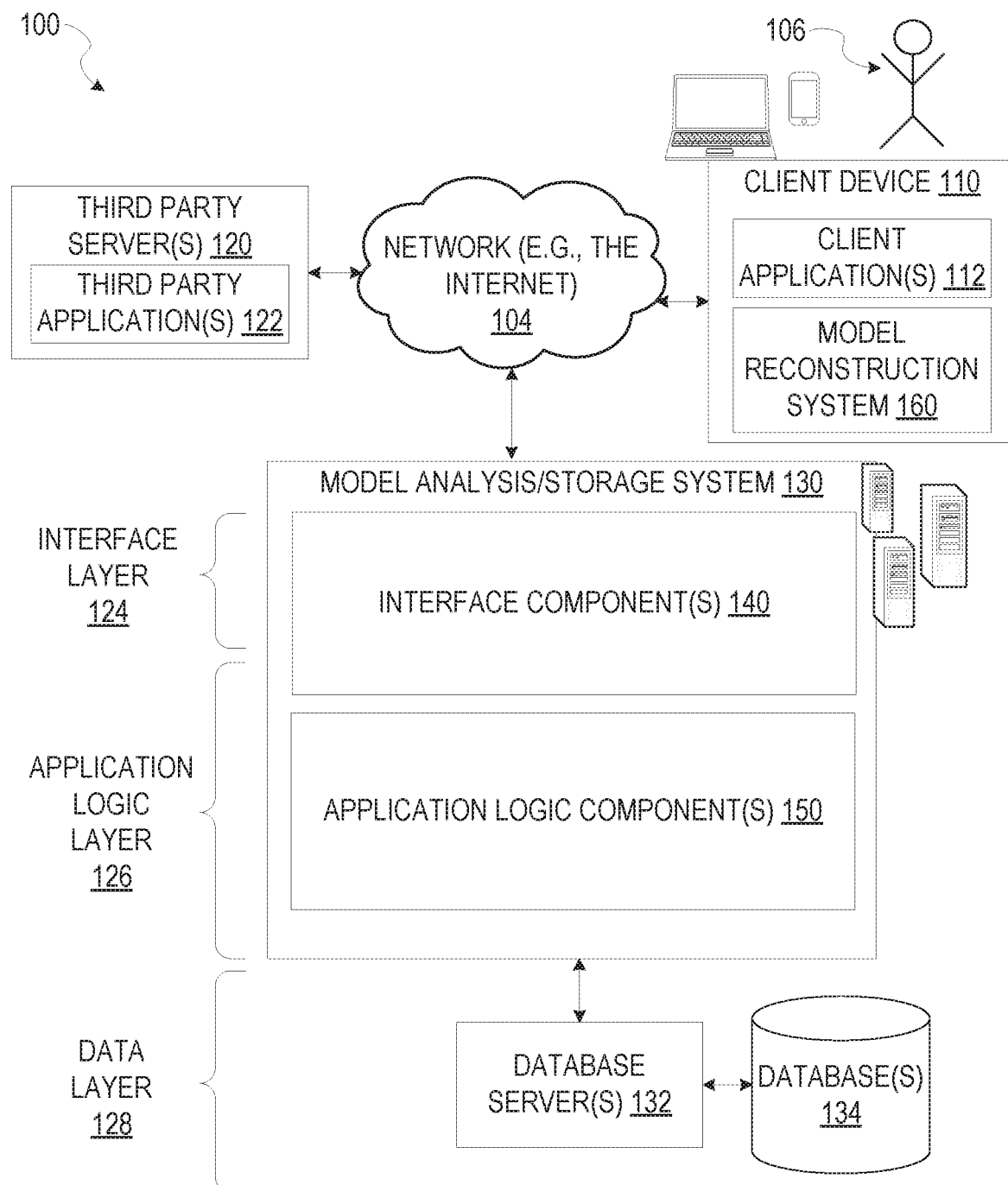
FIG. 1 is a block diagram illustrating a network system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

According to one aspect of the present disclosure, a model reconstruction system is described that enables a user to generate a three-dimensional model of an object in a field of view of an image capture component of a device operated by a user. The three-dimensional models may be understood as computer models, graphical models, virtual models, or any other model which may be reconstructed and rendered within a graphical user interface. Although described with respect to model reconstruction systems, it should be understood that embodiments of the model reconstruction system described in the present disclosure may incorporate or comprise scanning systems or scanning components. Such scanning systems or scanning components may enable mapping and identification of scenes or objects within scenes within a field of view of an image capture component, such as a camera. In some embodiments, the user opens an application on the device and positions an object to be modeled at least partially within the field of view of the image capture component. The application may be a vision-based system configured to map and reconstruct a three-dimensional model using sensors (e.g., a visible light camera, a depth sensor, a gyroscope, and an accelerometer) available on a smart phone or a mobile device in real-time or near real-time. The application generates augmented reality elements describing movements of the image capture device and presents these augmented reality elements to the user. The user moves the device based on the augmented reality elements and, in response to the movements, the application generates a three-dimensional model of the object in the field of view.

In some embodiments, the model reconstruction system is configured to reconstruct a foot as a three-dimensional model. In such instances, the user accesses a foot scanning application on a smart phone. The foot scanning application may provide instructions for initializing a scan of a foot to generate a foot model. To initialize the scan, the foot scanning application may identify a reference object with known dimensions, such as a card, and generate instructions for positioning the reference object and moving a camera of the smart phone relative to the reference object to capture images and map a portion of scene being scanned. It should be understood that the scene may comprise at least a portion of a field of view of the camera. Feedback for the user, in the form of how to position the device and where to move it, can be generated dynamically, responding to areas or portions of the foot which were missed in executing a previous movement. The dynamically generated feedback may seek or prompt a user to gather additional data (e.g., images). Once a suitable portion of scene is mapped, the foot scanning application may generate a scanning path for moving the camera and smart phone relative to the foot.

After establishing a partial map of the scene, the foot scanning application then generates augmented reality elements on a screen of the smart phone to guide the user in moving the smart phone along an optimal (e.g., a theoretically optimal or selected) path and automatically captures a sequence of images of the object from angles suitable for accurate reconstruction of the object. The optimal path may be determined automatically based on the partial map of the scene. During scanning, the foot scanning application, in real-time, computes the location and orientation of the device. The scanning application may modify the selected path based on the motion of the smart phone to dynamically generate an adaptive path and ensure a suitable number and distribution of data (e.g., images, feature points, depth measurements) is captured in a way that the entire surface is completely defined when the scanning process finishes. When the foot scanning application determines (automatically or with user input) sufficient data has been captured, the model reconstruction system may stop recording data and notify the user that the scanning process is complete. Using the data, the model reconstruction system may generate a three-dimensional model of the object (e.g., foot). The model may then be presented on the screen of the mobile computing device, used by other applications, or used in any other suitable manner.

Some previous scanning techniques employ an element that emits a signal, such as a laser, and are associated with power, size, and technical limitations, precluding usage of such scanning devices and model generation techniques in devices below a certain size, power, or other technological threshold. Previous image based systems and methods for three-dimensional object reconstruction often employ patterned markers in order to measure and reconstruct objects. Further, such systems and methods often employ stationary or fixed image capture devices to maintain a fixed distance and constant speed relative to the object being scanned. In previous systems, deviations from the prescribed scanning path relative to the object may prevent accurate object scanning. Previous systems and methods for object scanning, which use moving image capture devices are often similarly limited, employing movement of an image capture device, or a plurality of image capture devices, having a known position, relative to the object to be modeled, along an arc, set of positions, or other paths. In those previous systems, unexpected changes in the relative position, arc, or path of the image capture device often precludes accurate reconstruction of the object.

Reconstructing a three-dimensional scene may incorporate high quality images that cover an object of interest from all directions. It may be beneficial for these images to be well-exposed, sharp, with a maximally large depth of focus, and provide views of all surfaces of interest for a given object. For efficient processing, to decrease the computational time and user waiting time, the set of images processed during the dense reconstruction phase may provide the information of the object in each view and be distributed to avoid capturing redundant views. A major challenge for previous systems has been teaching a novice user how to perform the scanning. The lack of guidance for gathering useful images/data of the object may result in object reconstruction that is incomplete (missing geometry, holes) or inaccurate (deformed geometry, wrong scale). The distance at which to hold the client device from an object, the speed with which to move the device, the number of images/data to capture from a certain position, the angle with respect to the object from which to capture images, the suitable lighting, and characteristics of a scene properly set up are just some of the factors which are influenced by the user and on which users may be trained. A tutorial video or written instructions, as in previous systems, are not effective at communicating this information because the volume of information is large while user patience is limited. Embodiments of the present disclosure address some of these above-referenced technical and user interface by using augmented reality to guide the user in real-time throughout the scanning process.

Aspects and embodiments of the present disclosure address these technical problems, among others, by describing a model reconstruction system using a novel approach to generating a three-dimensional model of objects within a field of view of an image capture component of a user's mobile computing device. Some aspects or embodiments of the present disclosure address the extensive user training used by and technical limitations of previous systems by providing an augmented reality interface to dynamically guide the user in positioning the mobile computing device correctly during the scanning process. Embodiments of the present disclosure dynamically identify, select, and present augmented reality elements within a user interface, depicted within a field of view of the camera or image capture component of the mobile computing device along with the object to be scanned and modeled. The dynamic guiding may, in real time, compensate for inadequate scanning of portions of the object, unexpected or improper positioning of the mobile computing device, and other actions, operations, or circumstances relating to scanning or collecting images or other data of an object for generating a three-dimensional model.

The above are specific examples. The various embodiments of the present disclosure relate to devices and instructions by one or more processors of a device to generate object models for an object depicted or contained within a field of view of an image capture component. Various embodiments of the present disclosure also or alternatively relate to devices and instructions by one or more processors of a device to identify, select, generate, and present augmented reality elements on screen of a device. Embodiments of the present disclosure may generate object models using augmented reality elements. A model reconstruction system is described that guides a user, through presentation of augmented reality elements, in reconstructing a three-dimensional model of an object using a dynamically determined path or set of movements to collect data (e.g., images, depth measurements, surface elements) from varying views around the surface of the object.

FIG. 1 is a network diagram depicting a network system 100 having a client-server architecture configured for exchanging data over a network, according to one embodiment. For example, the network system 100 may be a model reconstruction system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a model analysis/storage system 130. In some embodiments, the model analysis/storage system 130 includes or comprises a web server capable of and configured to store models (e.g., three-dimensional models) and perform analysis operations on those models. Analysis operations may include determining measurements for models, comparative measurements based on the models, fitting operations, and other suitable model manipulation or image manipulation operations. An example description of components suitable for the model analysis/storage system 130 is described below with respect to FIG. 21. The model analysis/storage system 130 may incorporate a multi-tiered architecture. For example, the model analysis/storage system 130 may consist of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a model manipulation system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the model analysis/storage system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third-party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a model reconstruction system 160 such that components of the model reconstruction system 160 configure the client device 110 to perform a specific set of functions with respect to operations of the model reconstruction system 160. Although the model reconstruction system 160 is shown in FIG. 1 as part of the client device 110 or executed thereon, in some embodiments, all or a portion of the model reconstruction system 160 resides or is executed within the model analysis/storage system 130. In such embodiments, sensor or image data may be captured at the client device 110 and transmitted to the model analysis/storage system 130 (e.g., a cloud computing environment, a server, or other suitable processing environments), where the model reconstruction system 160 generates models from the sensor and image data. A resulting model, produced by the model reconstruction system 160 at the model analysis/storage system 130 may then be transmitted back to the client device 110 for one or more user interactions or operations.

In an example, the client device 110 is executing the client application(s) 112. The client application(s) 112 can provide functionality to present information to a user 106 and communicate via the network 104 to exchange information with the model analysis/storage system 130. Further, in some examples, the client device 110 executes functionality of the model reconstruction system 160 to guide a user in movements or actions relating to collecting data or scanning portions of an object for generating three-dimensional models of the object renderable in a graphical user interface.

Each client device 110 can comprise a computing device that includes at least a display, an image capture component, and communication capabilities with the network 104 to access the model analysis/storage system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the model analysis/storage system 130 via the client device 110. The user 106 may not be part of the network system 100, but may be associated with the client devices 110.

As shown in FIG. 1, the data layer 128 has database server(s) 132 that facilitate access to information storage repositories or database(s) 134. The database(s) 134 are storage devices that store data such as member profile data, model data (e.g., three-dimensional models previously generated by one or more of the model analysis/storage system 130 and the model reconstruction system 160), image modification preference data, accessibility data, and other user data.

An individual can register with the model analysis/storage system 130 to become a member of the model analysis/storage system 130. Once registered, a member can generate, retrieve, and send three-dimensional models and associated scan data (e.g., time of day, weather conditions, GPS coordinates, etc.) via the network 104. In some embodiments, members of the model analysis/storage system 130 interact with a broad range of applications provided by the model analysis/storage system 130, which provide functionality for which three-dimensional models may be used.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the model analysis/storage system 130. For instance, a modeling application (e.g., a software application including all or a portion of the model reconstruction system 160) can be implemented with at least a portion of the application logic components 150. The modeling application provides a messaging mechanism for users of the client devices 110 to send and receive messages that include text and media content such as three-dimensional models, pictures, and video. The client devices 110 may access and view the messages from the modeling application or access and view applications or user interfaces configured based on the transmitted messages or three-dimensional models. Of course, other applications and services may be separately embodied in their own application logic components 150.

As illustrated in FIG. 1, the model analysis/storage system 130 may include at least a portion of the model reconstruction system 160 capable of object reconstruction and incorporating augmented reality elements in a graphical user interface. Similarly, the client device 110 includes at least a portion of the model reconstruction system 160, as described above. In other examples, client device 110 may include the entirety of the model reconstruction system 160. In instances where the client device 110 includes a portion of (or all of) the model reconstruction system 160, the client device 110 can work alone or in cooperation with the model analysis/storage system 130 to provide the functionality of the model reconstruction system 160 described herein.

In some embodiments, the model analysis/storage system 130 may be an object measurement system that enables measurement, comparison, and fitting of objects or object models. In some instances, the objects being measured, compared, or fitted may be manipulated, examined, or modeled relative to another object. In such embodiments, a device uses the various components described herein within the context of any of generating, sending, receiving, or displaying aspects of a three-dimensional model and comparing or fitting the three-dimensional model to another object. For example, a device implementing the model reconstruction system 160 may generate three-dimensional object models from images collected using augmented reality to guide a user. The device may generate the three-dimensional object models as a part of a generation of content for object or three-dimensional model comparison.

Figure 2:
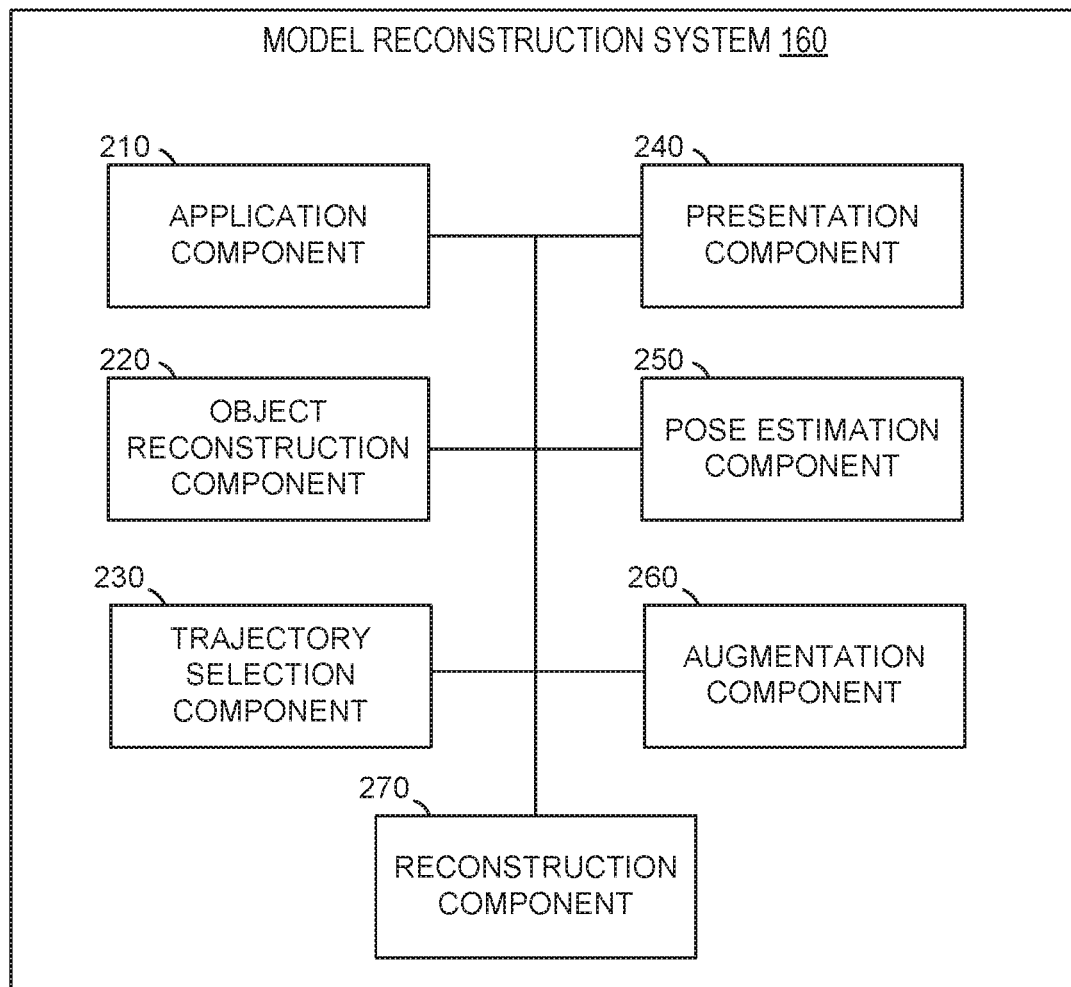
FIG. 2 is a diagram illustrating a modeling system, according to some example embodiments.

In FIG. 2, in various embodiments, the model reconstruction system 160 can be implemented as a standalone system or implemented in conjunction with the client device 110, and is not necessarily included in the model analysis/storage system 130. The model reconstruction system 160 is shown to include an application component 210, an object recognition component 220, a trajectory selection component 230, a presentation component 240, a pose estimation component 250, and an augmentation component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

As described in more detail below, the application component 210 enables interaction with differing modes or methods of operations within a graphical user interface for the model reconstruction system 160. The object recognition component 220 may detect objects, recognize (e.g., match objects to retrieved images), and provide input for reconstructing objects (e.g., as a three-dimensional model) within a field of view of the client device 110 camera or image capture component. The object recognition component 220 may also recognize known objects in a camera or image capture component field of view. In some embodiments, the trajectory selection component 230 dynamically or adaptively identifies and selects movements (e.g., an optimal path, a theoretically optimal path, or a set of allowed trajectories for a given time) that the client device 110 should execute to gather images and other scan data (e.g., depth information, feature points) for generating a three-dimensional model of an object. These movements or trajectories may be described by a single position/orientation, may be a series of position/orientation pairs, or constraints on domain regions the client device 110 should pass through or orientation ranges the client device 110 should assume to gather sufficient data for model reconstruction. The presentation component 240 presents visual (e.g., graphical user interface or visual augmented reality elements), described below in more detail. The pose estimation component 250 identifies positional information (e.g., computes the location and orientation) of the image capture component of the client device 110 by analyzing image and other sensor data (e.g., gyroscope, accelerometer, GPS, depth). Data extracted (e.g., features, feature points, edges, or depth measurements) by the pose estimation component 250 may be used by one or more components of the model reconstruction system 160 to identify a position and orientation of the client device 110, isolate objects to be modeled from reference objects, planar surfaces, or other elements within the field of view, model objects, and perform comparisons or measurements of objects or resulting models of the objects. The position and orientation of the client device 110 may be represented by coordinates corresponding to a location and a rotation matrix specifying a direction at which the image capture component is pointing. The augmentation component 260 guides users of the model reconstruction system 160 by generating augmented reality elements and presenting them to the users to assist with three-dimensional scanning of the object. In some embodiments, the augmentation component 260 receives input from the pose estimation component 250 and the trajectory selection component 230 to generate instructions, guidance, cues or other user perceivable output (e.g., visual, audio, haptic, or combinations thereof) to be surfaced to the user during operations of the methods described below.

Figure 3:
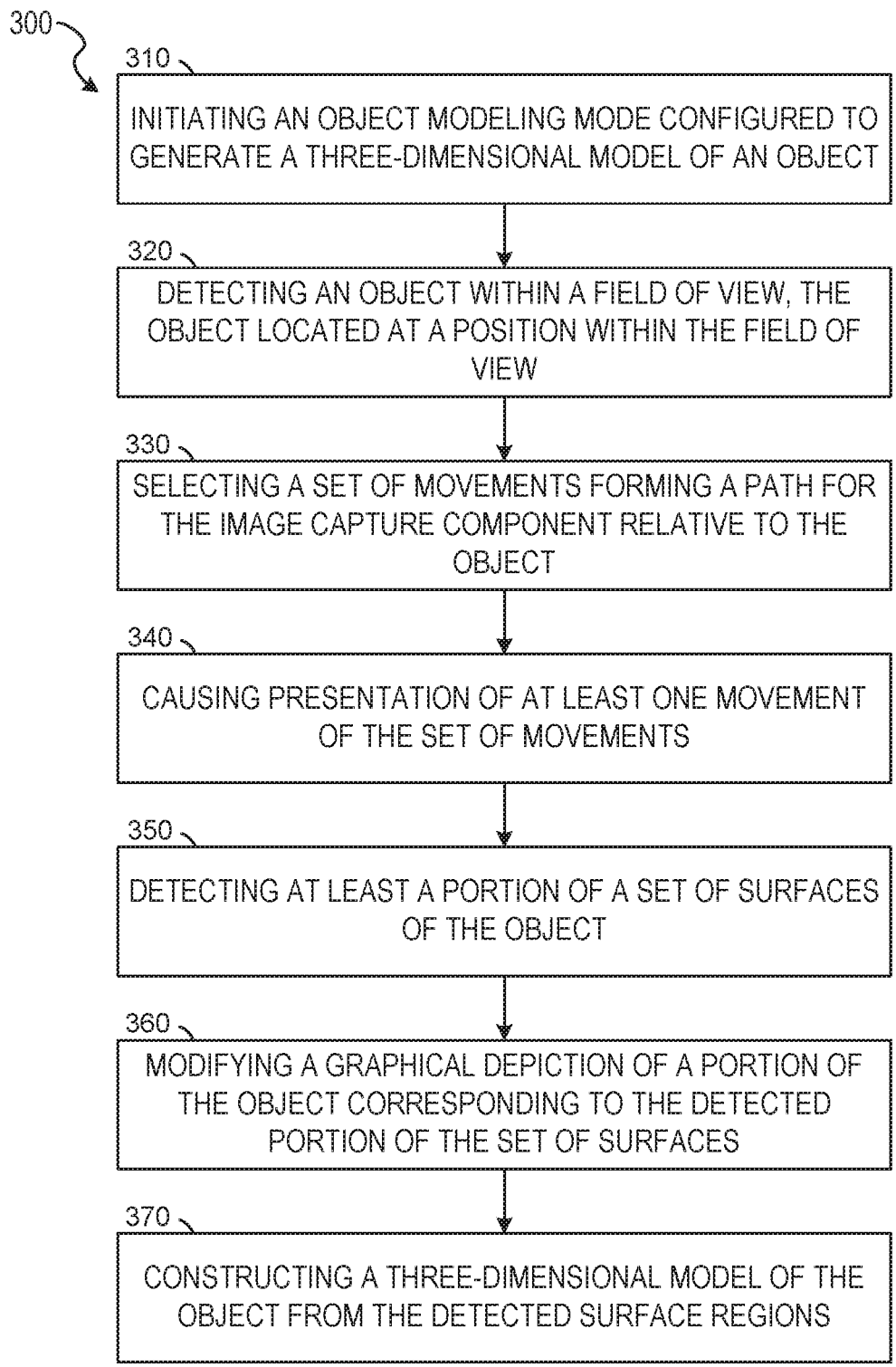
FIG. 3 is a flow diagram illustrating an example method for object modeling using augmented reality, according to some example embodiments.

FIG. 3 depicts a flow diagram illustrating an example method 300 for three-dimensional object scanning and modeling guided by augmented reality. The operations of method 300 may be performed by components of the model reconstruction system 160, and are so described below for purposes of illustration. Although FIG. 3 describes embodiments where operations of the model reconstruction system 160 are performed at or on a client device 110, in some embodiments, not shown, at least a portion of the model reconstruction system 160 is stored and executed at the model analysis/storage system 130. In such embodiments, one or more operations of the method 300 are performed at the client device 110 and resulting data is transmitted to the model analysis/storage system 130 for processing and transmission back to the client device 110 for display and manipulation by a user.

In operation 310, the application component 210 initiates an object modeling or scanning mode on the client device 110. In some embodiments, the object modeling mode presents a guided initialization process, described in more detail below (e.g., one or more of methods 900 or 1400). The guided initialization process initiates object scanning procedures such as mapping the structure of the scene and determining the scale through an onboarding phase that may include a combination of written, audio, or graphical instructions, video tutorials, and augmented reality elements to assist the user in performing the initialization steps. As such, the initialization process may provide instruction, guidance, or augmented reality elements configured to enable a user to map a field of view, determine a scale, and initiate object modeling procedures. In some instances, the object modeling mode is included within an application selected by a user. In such instances, the object modeling mode may be configured to execute operations for simultaneous localization and mapping (SLAM) of a scene visible within a field of view of an image capture component of the client device 110. In some embodiments, the object modeling mode may be configured based on the image capture component. For example, where the image capture component is a single camera, the object modeling mode may configure the application for monocular SLAM operations and where a plurality of cameras comprise the image capture component, SLAM operations may be configured to operate across the plurality of cameras. In embodiments where a depth sensor or depth capable image capture component is accessible by the model reconstruction system 160, the model reconstruction system 160 may use depth data in conjunction with, to supplement, or to replace a portion of the SLAM operations. The SLAM operations may be aided by other senses such as inertial measurement unit (IMU) depending on the availability of resources. The object modeling mode enables mapping of the scene, tracking of a position and orientation of the client device 110, capturing images from specific positions relative to one or more elements, points, aspects, or objects within the scene, and identifying portions of an object being scanned and to be modeled, where the object is at least partially present in portion of the scene visible to the image capture device for a period of time. In some embodiments, the object modeling mode is configured to generate a three-dimensional model of an object from an analysis of the scene.

The object modeling mode may be configured to scan and model any suitable or selected object within the field of view. In some instances, the object modeling mode is configured to model and scan a known type of object within the field of view. For example, the object modeling mode may be configured to identify a foot within the field of view, guide a user in changing a position of the image capture device relative to the foot, and generate a three-dimensional model of the foot. The three-dimensional model (e.g., a graphical or graphically renderable model) may be depicted on a display component of the client device 110 after reconstruction of the model. In some instances, the three-dimensional model is generated within a data structure as a triangular mesh comprised of vertices, a set of coordinate points associated with a three-dimensional coordinate system and faces (e.g., surfaces). The data structure may be retrieved and interpreted to generate or otherwise construct a three-dimensional model or a physical model of the object.

The application component 210 may initiate the object modeling mode in response to receiving a selection of an application from an input component (e.g., a keyboard, a mouse, or a touchscreen) of the client device 110. Where the initiation is responsive to selection of an application, the input component may receive or otherwise identify a selection of an icon or other representation of a modeling application. Upon selection of the modeling application, to initiate the object modeling mode, the application component 210 may open the application and place the application in the object modeling mode.

In some instances, the application component 210 initiates the object modeling mode on the client device 110 while the modeling application is in operation. In such embodiments, the input component receives or identifies selection of a modeling icon. The modeling icon may represent the object modeling mode within a graphical user interface of the modeling application. For example, once the modeling application is opened, a graphical user interface of the modeling application may present options corresponding to functionality of the modeling application. In some instances, the modeling application provides selectable functionality for detecting objects in a field of view of an image capture component, sharing or distributing previously generated object models, comparing previously generated object models, generating new object models, and other suitable functionality. Although described with respect to selection of a graphical icon, it should be understood that the input component may receive or identify selection of the object modeling mode from an audio input (e.g., a voice command, voice recognition, or tonal command), biometric input (e.g., gaze direction, eye movement, blinking, or other facial movements), or any other suitable input detectable by the input device.

In operation 320, the object recognition component 220 detects an object within a field of view of an image capture component of the client device 110. The object may be located at an identified position within the field of view. In some embodiments, the object recognition component 220 detects the object and the position of the object based on a selection received from the input component of the client device 110. In such embodiments, the field of view of the image capture component is depicted within a display component (e.g., a touchscreen) of the client device 110. The input component receives a user selection, such as a tap, mouse click, or a vocalization indicating at least a portion of the object at a specified position in the field of view. Using the specified position identified in the user selection, the object recognition component 220 may perform one or more detection operations (e.g., edge detection, point detection, histogram comparison, template-matching, or image recognition) to identify the object proximate to, contacting, or at least partially encompassing the specified position.

For example, where the object to be modeled is a foot, the user may position the field of view of the image capture component to include at least a portion of the foot. The user may then tap on the foot within the field of view, as seen through a camera preview window on a touch screen of the client device 110. The tap may be received as input selecting the object (i.e., the foot). The tap may be passed to the object recognition component 220, which responds by identifying the foot based on the location of the tap.

In some embodiments, the object recognition component 220 detects the object within the field of view based on an initial set of points detected within the field of view, as will be explained below in more detail. The object recognition component 220 may identify the initial set of points as points of interest within the field of view. The initial set of points may be determined by changes in color, identifiable edges, textures, shadows, or any other point discernable by the image capture component or depth sensor. The initial set of points may include points on a surface of the object and points on a surface of other aspects or objects in the scene, such as a table or floor surface (i.e., a planar surface on which the object is positioned). The object recognition component 220 may then isolate points associated with the object from points corresponding to other elements within the field of view of the image capture component.

In some embodiments, the image capture component is coupled to the client device 110. The image capture component may be coupled to the client device 110 as an integral component of the client device 110, such as a camera of a smart phone, a plurality of cameras, a depth camera, or any other suitable image capture device. In some instances, the image capture component is external to the client device 110 and coupled to the client device 110 via a communication component, such as a signal transceiver (e.g., a Bluetooth transceiver).

In operation 330, the trajectory selection component 230 selects a set of movements forming a path relative to at least a portion of the scene in the field of view of the image capture or depth sensing component. The trajectory selection component 230 may receive input from onboard sensors of the client device 110. In some instances, the trajectory selection component 230 tracks a state of the client device 110. Upon receiving the sensor input, the trajectory selection component 230 defines a path (e.g., a theoretically optimal path) used by one or more components of the model reconstruction system 160 (e.g., the augmentation component 260) for comparison to actual movements or motions of the client device 110. The augmentation component 260 can then identify movement or image capture deficiencies and generate feedback how the trajectory should be adjusted. In some embodiments, a set of movements form the path as a path for the image capture component relative to the object. The set of movements may be selected based on the position and orientation of the object within the scene and the position and orientation of the image capture component relative to the object.

In some embodiments, the trajectory selection component 230 receives information from one or more components or sensors of the client device 110 to be evaluated in selecting the set of movements. Components or sensors of the client device 110, such as accelerometers, magnetometers, gyroscopes, depth sensors, and global positioning system (GPS) transceivers, may be used to determine one or more of a position and an orientation (i.e., a pose) of the client device 110 and the image capture component. In some instances, one or more portions of the image capture component provide information to the pose estimation component 250 to enable a determination of the intrinsic camera parameters (e.g., focal length, radial distortion, and image center) for the image capture device.

Using the information from the components or sensors of the client device and data collected from the image capture component, the reconstruction component 270, cooperating with the trajectory selection component 230, the pose estimation component 250, and the object recognition component 220 may perform one or more global bundle adjustment operations to precisely determine the position and orientation of the client device 110 relative to the object. In some instances, the trajectory selection component 230 and the pose estimation component 250 use one or more sequential algorithms to initialize the position and orientation determination using at least two images captured by the image capture component. The two or more images may be captured in an initialization process described below with respect to method 900. The at least two images may be images captured by the image capture component sequentially and may have enough matching features sufficient for reconstructing a scene using structure from motion techniques. In some embodiments, the sequential algorithms determine a rough estimate of image capture component parameters, or receive the image capture component parameters from components of the client device 110. For example, the sequential algorithms may use Direct Linear Transformation or EXIF image tags, to determine focal length. In some embodiments, the parameters of the gyroscope and accelerometers can be determined at the same time and in conjunction with the image capture component parameters. The sequential algorithms then update the internal parameters and pose parameters of the sensors using one or more bundle adjustment operations.

In some embodiments, an estimation of image capture component orientation and position is performed by the pose estimation component 250. The estimated orientation and position are then refined using global bundle adjustment by the reconstruction component 270. In such embodiments, the reconstruction component 270 may not select the two or more images, as described above.

In some embodiments, once the object has been detected within the field of view, the trajectory selection component 230 selects the set of movements by querying the pose estimation component 250. The pose estimation component 250 relies on the sensors (listed previously) of the client device 110 to estimate parameters for the image capture component with seven degrees of freedom. The seven degrees of freedom may be understood as three angles of rotation for an orientation (or alternatively represented as a quaternion) of the image capture component, three-dimensional vectors defining a position of the image capture component in three-dimensional space, and the focal length of the image capture component. The components of the client device 110 and portions of the image capture device may provide input to the pose estimation component 250, enabling the estimation of at least a portion of the parameters. In some instances, some of the parameters are determined as static or known values, while other parameters are estimated or determined based on movement of the image capture component during an initialization operation or set of operations, described in more detail below.

The trajectory selection component 230 may continuously receive the values for the device's pose from the pose estimation component 250 (e.g., parameters for seven degrees of freedom of movement) the trajectory selection component 230 determines a set of positions in three-dimensional space to which the image capture component should move. An image may be associated with each pose (position and orientation) of the image capture device in the trajectory. A set of images, resulting from capturing an image at a plurality of positions making up the trajectory, depict overlapping views of the object. In some instances, the trajectory selection component 230 determines a theoretically optimal set of images based on characteristics of the scene (e.g., number of objects present and texture information), size of the object being scanned, environmental conditions (e.g., lighting), user preferences for reconstruction accuracy, hardware specifications of the device, and others. One example of a trajectory is a set of images may be uniformly spaced around the object such each patch of an object's surface area is covered by a sufficient number of images. In some instances, the set of images include images to be captured at two or more heights in three-dimensional space relative to the object. The trajectory selection component 230 may also determine a distance for the image capture component, relative to the object, at which the set of images is to be captured. For example, the trajectory selection component 230 may determine a distance of between fifteen and fifty centimeters is a suitable distance, based on one or more of a size, a type, or a dimension of the object. Although described with specified distances, it should be understood that larger or smaller distances may be used depending on a size of the object. Given an optimal set (e.g., a theoretically optimal set) of positions from which images are to be captured, the trajectory selection component 230 may also determine the sequence in which they are captured and how the device should move between the set of positions, or a portion thereof. As such, given the positions, the trajectory selection component 230 may select the set of movements as a sequence of position changes, causing the image capture component to pass between the set of positions, or a portion thereof.

In some embodiments, upon selecting the set of movements, the trajectory selection component 230 generates directions for each movement. The directions for each movement may comprise instructions for moving the image capture component between each position selected from the set of positions. The trajectory selection component 230 may generate the directions in cooperation with the augmentation component 260 and the presentation component 240. In such instances, the augmentation component 260 generates graphical representations of the directions. The graphical representations may comprise one or more of a written description, a direction, a path portion, and a movement indicator. In some instances, the augmentation component 260 generates one or more audio indicator or one or more haptic indicators for each movement.

Figure 4:
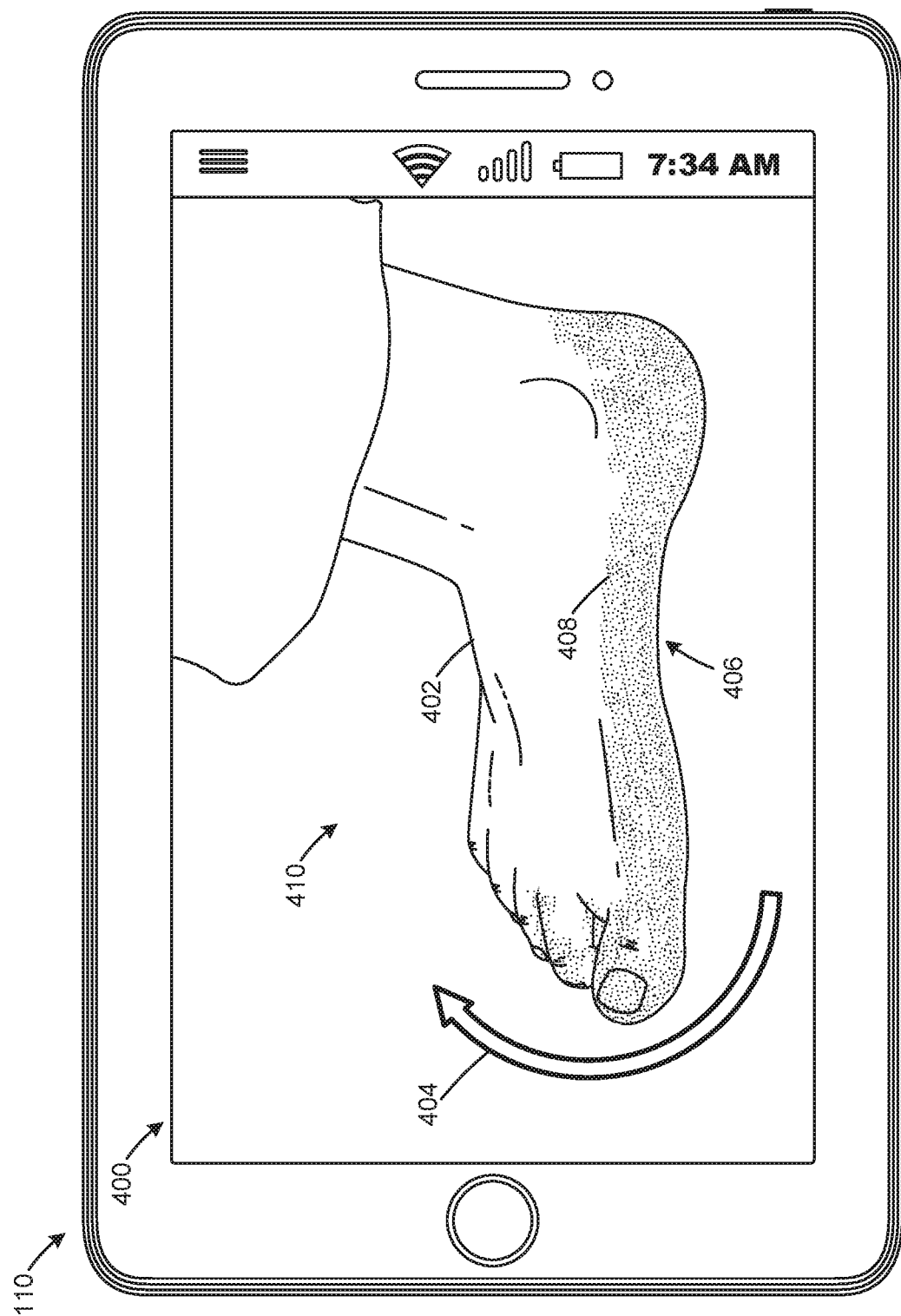
FIG. 4 is a user interface diagram depicting augmented reality elements corresponding to movements of an image capture component in graphical three-dimensional model generation, according to some example embodiments.

In operation 340, the presentation component 240 causes presentation of at least one movement of the set of movements. As referenced above, in some embodiments, the presentation component 240 or the trajectory selection component 230 causes presentation of a movement of the set of movements in cooperation with the augmentation component 260 and the presentation component 240. For example, as shown in FIG. 4, a first field of view 400 is displayed on a display device of the client device 110. Within the first field of view 400 is depicted an object 402 to be modeled. The augmentation component 260 generates a visual element that is placed in context with real-world environmental elements of at least one movement to be presented. For example, a movement indicator 404 may be overlayed on top of the live camera feed in an appropriate location in the world coordinates to make it appear as if it is present in the real-world. The movement indicator 404 may include representations of one or more directions of the movement. For example, as shown, the movement indicator 404 includes an arrow showing a direction of movement in an arc. The one or more directions may form at least a portion of the path comprising the set of movements. In some instances, the graphical representation of the movement includes one or more of movement speed, image capture component angle relative to the object, and distance of the image capture component relative to the object for moving the image capture component about the object. The presentation component 240 may cause presentation of the graphical representations of movements within a display component of the client device 110 upon receiving the graphical representations from the augmentation component 260.

Figure 5A:
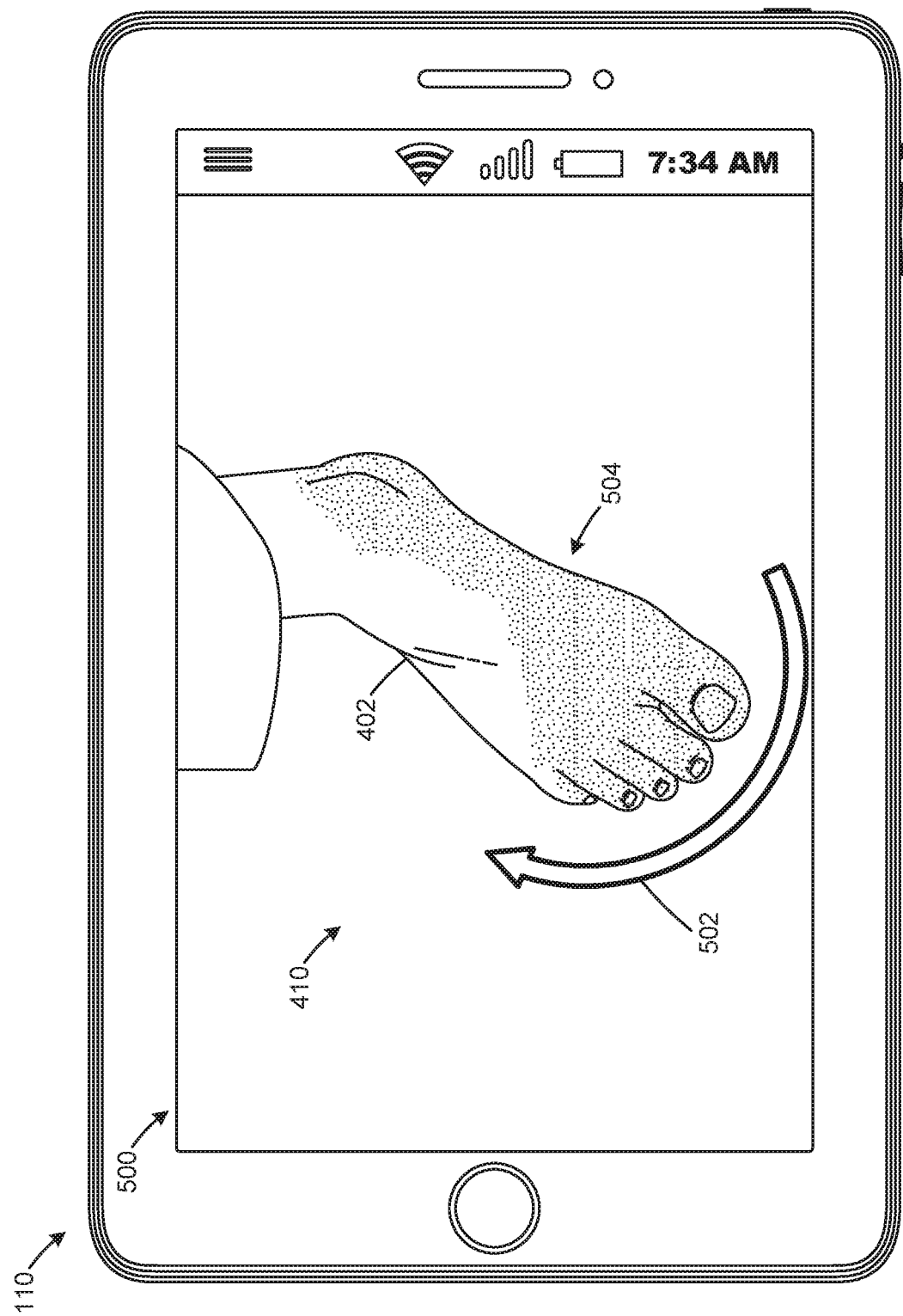
FIG. 5A is a user interface diagram depicting augmented reality elements corresponding to movements of an image capture component in graphical model generation, according to some example embodiments.
Figure 5B:
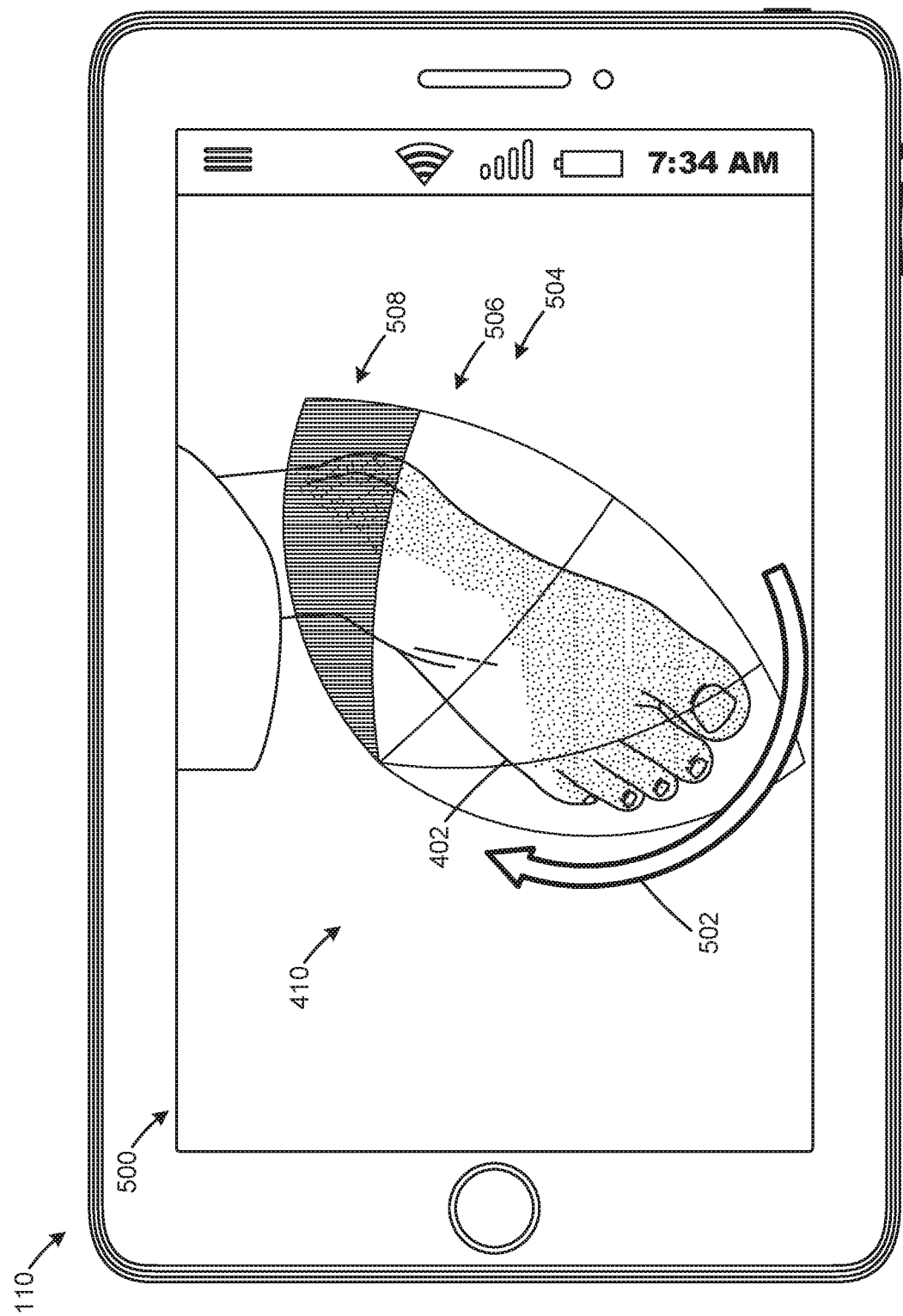
FIG. 5B is a user interface diagram depicting augmented reality elements corresponding to movements of an image capture component in graphical model generation, according to some example embodiments.
Figure 6:
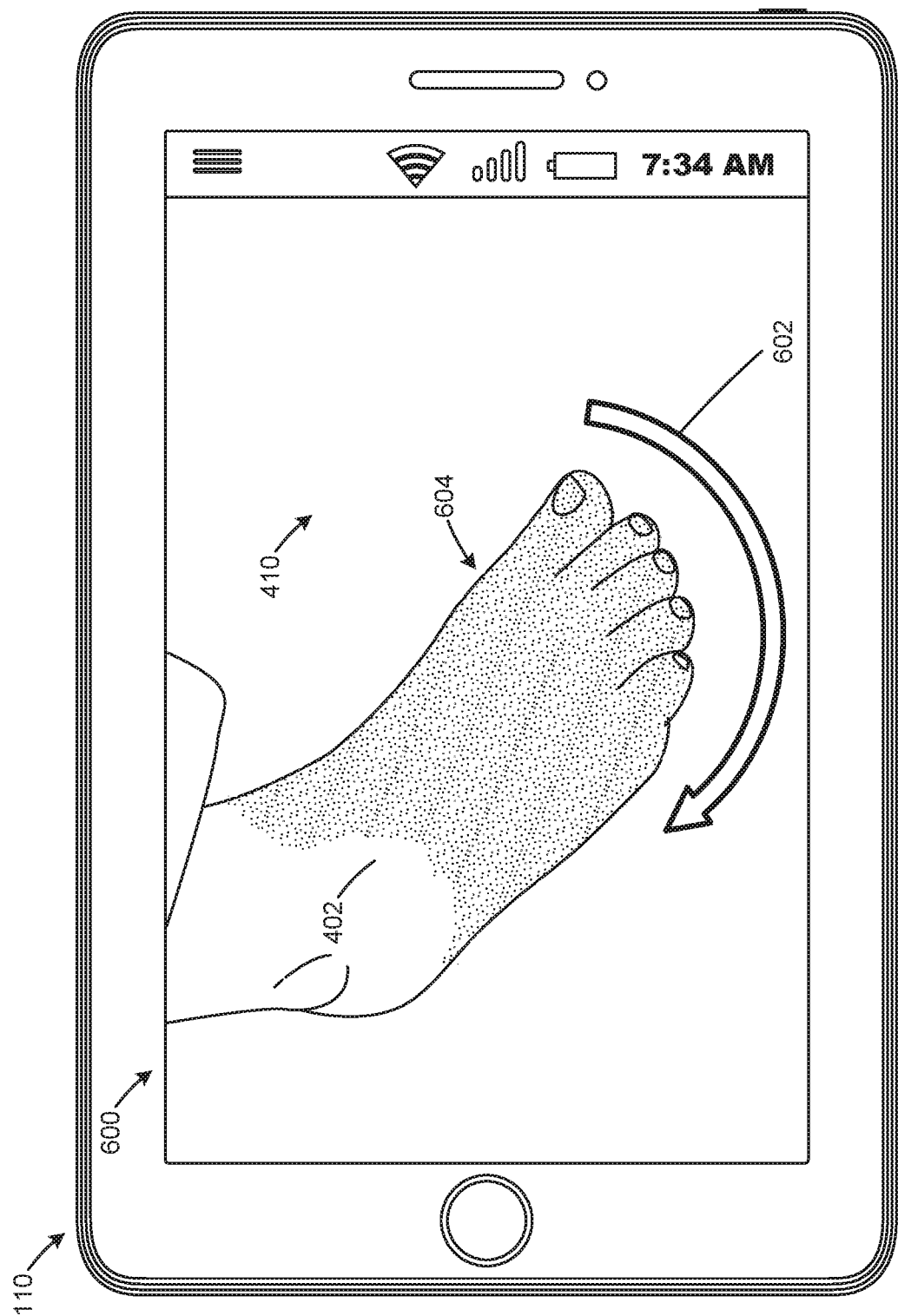
FIG. 6 is a user interface diagram depicting augmented reality elements corresponding to movements of an image capture component in graphical model generation, according to some example embodiments.
Figure 7:
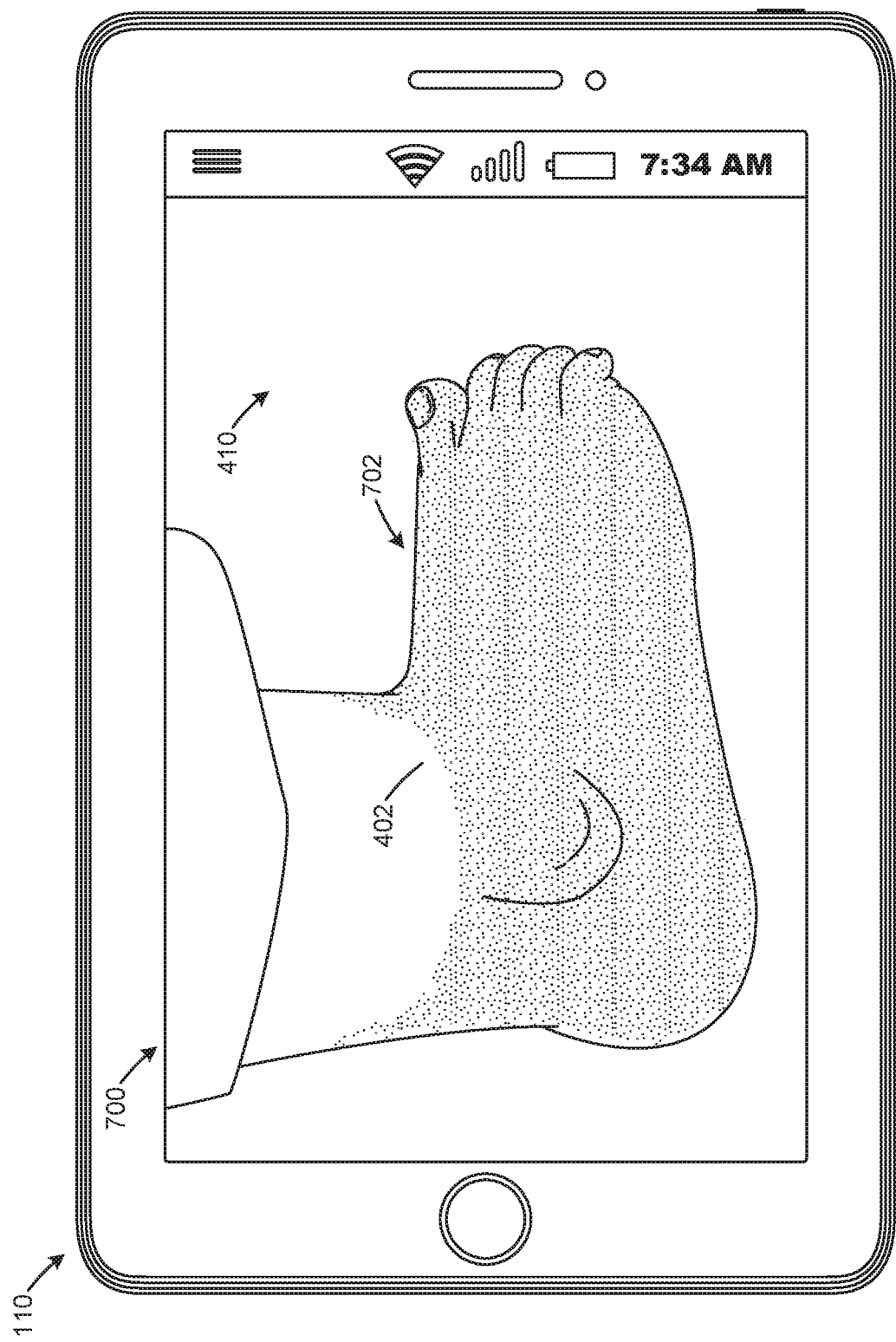
FIG. 7 is a user interface diagram depicting augmented reality elements corresponding to movements of an image capture component in graphical model generation, according to some example embodiments.

As shown in FIGS. 4-6, the augmentation component 260, in cooperation with the trajectory selection component 230 and the presentation component 240, generates and causes presentation of three movement indicators 404, 502, and 602. The augmentation component 260 may initially cause presentation of a first movement indicator 404, as shown in FIG. 4. The first movement indicator 404 may be selected in response to the first field of view 400, a first position of the object 402 (e.g., the foot) depicted in the first field of view 400, and parameters determined for the image capture component of the client device 110 relative to the object 402.

In operation 350, the pose estimation component 250 detects a set of feature points defining the structure of the scene within the field of view. In some embodiments, the set of feature points comprise or represent a surface, a set of surfaces, a surface region, or a set of surface regions on the object or aspects or elements within the field of view in addition to the object. Although described with respect to feature points of an object or a scene including the object, it should be understood that the pose estimation component 250 may also detect planes, surfaces, curves, definable features, edges, or any other suitable detectable element from which a model may be generated or reconstructed. The set of feature points may be detected as portions of the scene positioned within the field of view. The set of feature points may define one or more surfaces of the scene or objects within the scene. In some embodiments, portions of the scene that are positioned within the field of view are responsive to position changes of the image capture component. The changes in position of the image capture component may be changes in position relative to the scene, or the object, and correspond to at least a portion of the set of movements defined by the trajectory selection component 230.

For example, as shown in FIGS. 4-6, as the client device 110 is moved around a scene 410, including the object 402, responsive to movement indicators 404, 502, and 602, different angles, views, or portions of the object 402 are presented in the field of view. As a new portion of the object 402 or scene 410 enters the field of view, the pose estimation component 250 detects and stores the new feature points. The pose estimation component 250 may detect feature points in response to capturing an image once the image capture component is moved to a location corresponding to a position selected in operation 330.

In operation 360, the augmentation component 260 renders one or more three-dimensional models (e.g., the object 402 and one or more other objects or aspects of the scene 410) comprising a virtual representation of the scene 410 and augments the view seen by the image capture component by overlaying the rendered images on or within the device screen, which may have the camera preview screen displayed. This technique makes virtual elements appear to be present in the real-world by modifying a graphical depiction of a portion of the object (e.g., a detected portion of the object). In some embodiments, the augmentation component 260 modifies the graphical depictions of the object (e.g., the virtual world) in response to detecting at least a portion of the points belonging to the scene being scanned (e.g., points corresponding to the object) as the scene points, surfaces, or surface regions, or a portion thereof are being detected in operation 350. In some instances, the modified three-dimensional elements of the object (e.g., points within the virtual world) correspond to the portion of detected scene points (e.g., feature points detected by the pose estimation component 250). The augmentation component 260 may modify the depiction these points as the feature points are being detected. For example, the augmentation component 260 may generate and render dots, circles, pins, or any other suitable shapes or icons at each object point responsive to the scene point being detected in real-time or near real-time. In some instances, the augmentation component 260 modifies three-dimensional depictions of the object or three-dimensional models present in the virtual world at locations and at an area surrounding, partially surrounding, or proximate to locations corresponding feature point detected in the real-world (e.g., on the object or within the scene) as soon as each point is detected. For example, the augmentation component 260 may generate and render circles, squares, ellipses, or any other suitable shape, centered at each scene feature point, responsive to the point being detected in real time.

The augmentation component 260 may modify the three-dimensional virtual model augmented into the scene or the graphical depiction of the object by modifying by changing a color, an opacity, or any other visible characteristic of the model, or the object represented by the model. In some instances, the augmentation component 260 modifies the graphical depiction of the object by generating and rendering an overlay covering at least a portion of the object proximate to the object points as the object points are detected. In such instances, the overlay may obscure or partially obscure areas of the object near the object points. For example, as shown in FIGS. 4-7, the augmentation component 260 dynamically modifies the depiction of the object, or portions thereof, as the field of view (e.g., field of view 400, 500, 600, and 700) moves around and depicts different angles of the object 402. The augmentation component 260 dynamically modifies portions of the object by generating and rendering an augmentation element 406 or set of augmentation elements 406 by positioning three-dimensional models in the virtual world and overlaying the rendered images in view of the image capture component. In some instances, the augmented elements are positioned as overlays or changes to a depiction of an object. As shown, the augmentation element 406 or augmentation elements 406 are placed in the virtual world and rendered to appear to be in the real-world scene with the object 402. In some embodiments, the augmentation elements 408 may appear as discretized elements constituting a geometry, set of points on the augmentation element 406 or in space (e.g. simulating a spray-painted area). The augmentation element 406 or augmentation elements 406 may be modified by changing color, shade, or otherwise and appear as augmentation element 408 or augmentation elements 408. In some embodiments, the augmentation element 406 or a set of augmentation elements 406 may serve to indicate an amount of progress along the path or in detecting the object 402, surfaces of the object, or feature points, as described herein.

In some embodiments, as the image capture device traverses a given path, the pose estimation component 250 detects feature points. Path traversal may be based on or corresponding to movements of the image capture component along the path created by the set of movements. The pose estimation component 250 may detect the subset of feature points belonging to the object or scene being scanned during a time frame or time increment between position changes of the image capture component as it traverses the path or executes movements from the set of movements. For each object point which is detected, the augmentation component 260 iteratively modifies the scene being rendered by generating augmented reality elements during a pendency of operation 360. In some embodiments, the graphical depiction is iteratively modified at a location on the object corresponding to the object points most recently detected. For example, in some instances, the rendered images within the preview on the display of the client device 110 highlight portions of the object with feature points which have been detected. As such, in some instances, the pose estimation component 250 and the augmentation component 260 dynamically identify portions of the object associated with object points or surfaces as the object points or surfaces are being detected.

Based on the dynamic identification of portions of the object and scene feature points belonging to the object being scanned, the augmentation component 260 dynamically modifies the graphical representation of the object or three-dimensional models in the virtual world representing the object as the object and the field of view being displayed within a display component of the client device 110 changes. In some embodiments, the augmentation component 260 modifies a depiction of the object or the three-dimensional models in the virtual world such that, as each new point belonging the object being scanned is detected, a portion of the object of interest proximate to the detected object point is modified by an augmentation element. For example, as shown in FIGS. 4-7, as new object points are detected upon entering the field of view, new augmentation elements (e.g., augmentation elements 406 in FIG. 4, augmentation elements 504 in FIG. 5A, augmentation elements 604 in FIG. 6, and augmentation elements 702 in FIG. 7) are progressively added to, incorporated into, or overlaid onto the depiction of the object 402 within the graphical user interface. Although shown in FIGS. 5A, 6, and 7 as augmented reality elements depicted on or about the object (e.g., the foot), it should be understood that augmented reality elements may be generated and provided to cover areas around or extending away from the object. Further, as shown in FIG. 5B, augmentation elements may be generated to show progress of movement or scanning of the client device 110. For example, as shown a progress element 506 may be generated and displayed. As movement of the client device 110 is detected and additional portions of the object are captured or detected, the progress element 506 may be iteratively or progressively modified by a current element 508. As shown, the current element 508 shades, changes color, or otherwise modifies at least a portion of the progress element 506 to indicate an amount of progress along the path or in detecting the object, surfaces of the object, or feature points, as described herein.

In some embodiments, upon detecting a feature point, the pose estimation component 250 stores the feature point or an indication of the feature point in a processor-readable storage medium (e.g., a memory, a database, or other storage location) accessible to the model reconstruction system 160. In some instances, the pose estimation component 250 stores the feature points or corresponding feature point indicators in a data structure configured for receiving one or more of the data points, indicators for the data points, augmentation elements, and at least a portion of a three-dimensional model generated for the object or objects being scanned. In some instances, upon generating augmentation elements and modifying graphical representations (e.g., virtual world elements) corresponding to the detected feature points, the augmentation component 260 stores the augmentation elements in the processor-readable storage medium. The augmentation component 260 may store the augmentation elements or an indication thereof in the data structure, such that each augmentation element or indicator representing the augmentation element may be associated with a corresponding feature point.

In operation 370, the reconstruction component 270 constructs a three-dimensional model of the object being scanned. Although described with respect to a three-dimensional model, a model visible or otherwise perceptible to a user within a graphical user interface, it should be understood that the reconstruction component 270 may construct or reconstruct any suitable model which may be reconstructed and displayed as a three-dimensional model. The model generated by the reconstruction component 270 may be a structured data record, such as a set of points or coordinates within a data table; a set of polygonal structures; a list of coordinates; a point cloud; a structured point cloud comprising points, point locations, and distances between the point clouds and point locations; or any other suitable mathematical model. In some instances, the reconstruction component 270 constructs the three-dimensional model in response to detecting that a particular set of movements have been completed by the image capture component. The reconstruction component 270 may detect that the set of movements have been completed based on a number of position changes of the image capture component, where the position changes correspond to the set of movements. In some embodiments, the reconstruction component 270 constructs the three-dimensional model upon determining that a suitable or predetermined number of feature points around the object being scanned have been detected, or a set of images covering the object from the views which have been captured.

In some embodiments, the reconstruction component 270 receives the set of feature points detected during operations 350 and 360 (e.g., detected feature points, detected surfaces, or detected surface regions), the camera poses (location and orientation), a set of images captured, and sensor (e.g., camera) parameters. The reconstruction component 270 may perform a bundle adjustment step that can be local or global to obtain or improve the estimate of the poses and sensor parameters. For bundle adjustment a sequential algorithms may be used by initializing with a pair of images that have enough matching features but also sufficient parallax and add cameras one by one. A rough estimate of camera parameters may be obtained using the Direct Linear Transformation and EXIF image tags for focal length, and then, the estimate may be updated using bundle adjustment. Instead, sensor (e.g., camera) parameter estimates obtained from executing SLAM may be used as a starting point; these estimates may be refined with global bundle adjustment to calibrate the sensors.

Then, the reconstruction component 270 can perform a dense reconstruction step to obtain a three-dimensional model of the object being scanned from the set of images and data captured. The reconstruction component 270 may initially perform a rough dense reconstruction. The rough dense reconstruction may generate an initial model, for the object. The reconstruction component 270 may then project the initial model into each captured image along the path referenced in operation 330.

After projecting the initial three-dimensional model (result of the rough, dense reconstruction) into the captured images, the reconstruction component 270 obtains object contours for the object, such as from the object points, from edge detection, or from other suitable sources. The reconstruction component 270 may use the contour as the initialization (e.g., by selecting and placing seeds inside and outside of the contour of the object) and performs one or more image segmentation operations on the captured images. In some embodiments, the one or more image segmentation operations are performed via fast GrowCuts.

The reconstruction component 270 may modify the initial model based on segmentations results to make the three-dimensional model more similar to the object being scanned. In some instances, prior to or during generation of the final model, the reconstruction component 270 performs one or more refinement operations on the three-dimensional model by minimizing an image consistency error; one example is the image re-projection error computed by projecting one image from the set of all images captured onto the three-dimensional model, and then from the three-dimensional model into another image domain and computing the difference. In some embodiments, as described in more detail below, dense reconstruction is performed using an atlas from a library of atlases corresponding to the object model being reconstructed. The atlas may be a structured data record representing a three-dimensional model of a physical object.

Figure 8:
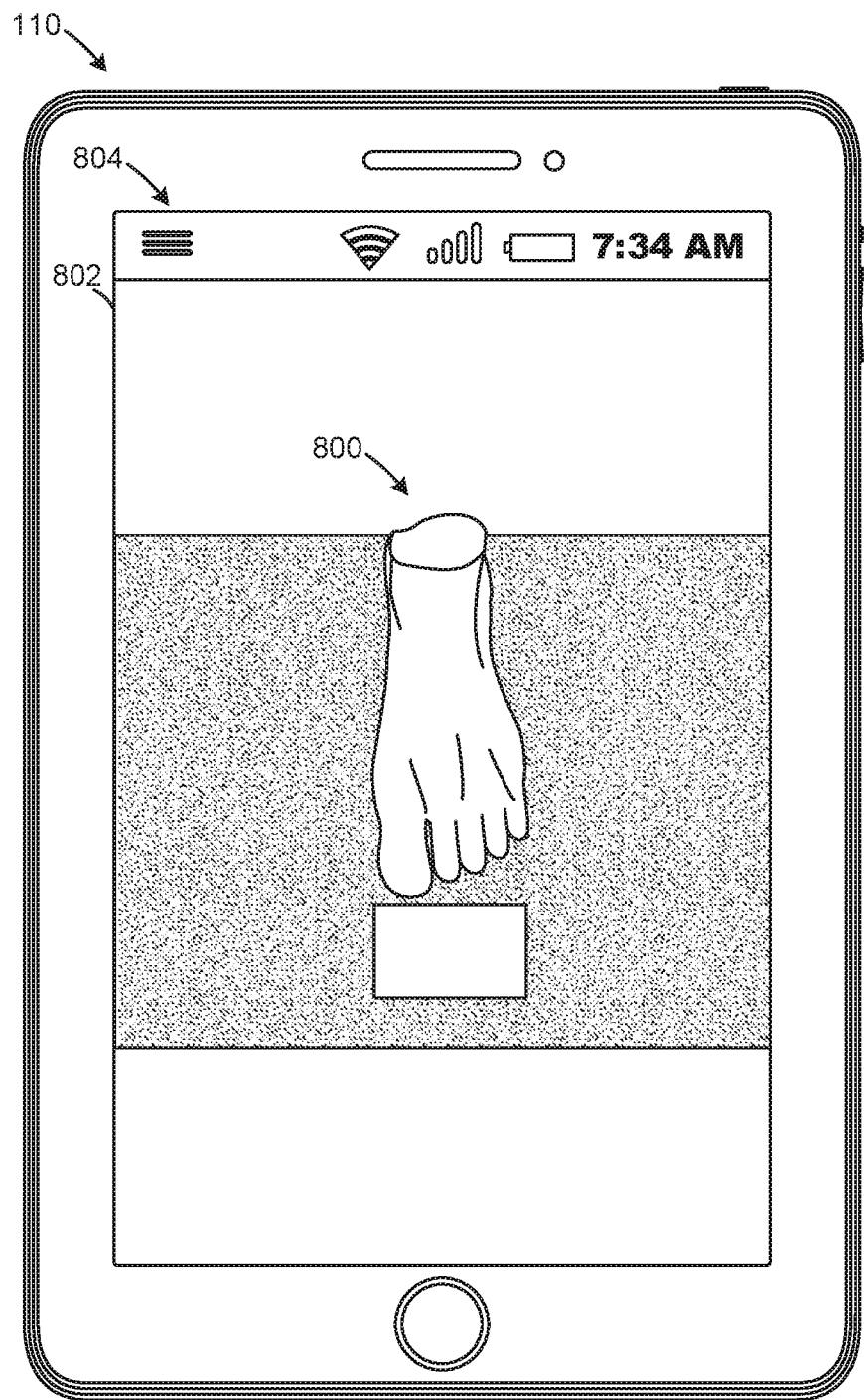
FIG. 8 is a user interface diagram depicting a graphical model generated for an object captured according to movements corresponding to augmented reality elements, according to some example embodiments.

Once the three-dimensional model is reconstructed, the reconstruction component 270 may cooperate with one or more components of the model reconstruction system 160 to display the model. For example, as shown in FIG. 8, the reconstruction component 270 generates or constructs a model 800 and the presentation component 240 causes presentation of the model 800 within a graphical user interface 802 depicted on a display component 804 of the client device 110.

Figure 9:
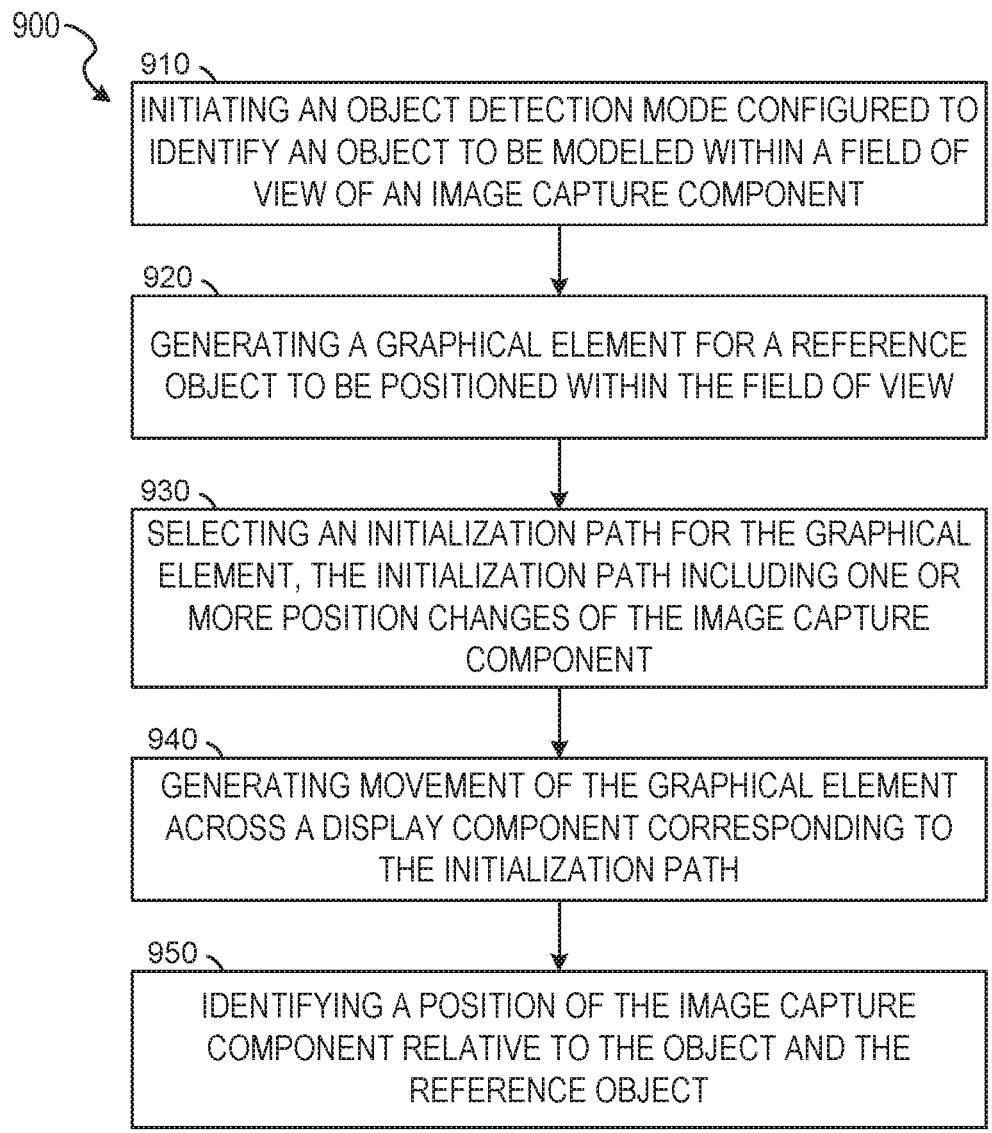
FIG. 9 is a flow diagram illustrating an example method for object modeling using augmented reality, according to some example embodiments.

FIG. 9 depicts a flow diagram illustrating an example method 900 for object scanning and modeling using augmented reality. The operations of method 900 may be performed by components of the model reconstruction system 160. In some instances, certain operations of the method 900 may be performed using one or more operations of the method 300 or as sub-operations of one or more operations of the method 300, as will be explained in more detail below.

In operation 910, the application component 210 initiates an object detection mode within the client device 110. In some embodiments, the object detection mode is part of the object modeling application for which the object modeling mode is initiated. In some instances, the object detection mode is an initialization portion of the object modeling mode or object modeling application. Where the object detection mode initiates or provides an initialization for the object modeling mode or application, the object detection mode enables identification of objects in a field of view, such as reference objects. The object detection mode may also enable mapping of the scene, within the field of view, or portions thereof. In mapping the scene, the object detection mode may enable motion or movement instructions and image capture by the image capture component. Movement and image capture in the object detection mode may enable capture of images having sufficient parallax to be used in monocular SLAM or other SLAM operations. As such, the object detection mode may be configured to identify an object or objects to be reconstructed within a field of view of an image capture component of the client device 110. Further, the object detection mode may be configured to identify, track, and coordinate augmented reality elements for a reference object depicted within the field of view.

In operation 920, the augmentation component 260 generates a graphical element, such as a frame, for a reference object. The reference object may be an object of known dimensions, or within a range of known dimensions, and to be positioned within the field of view of the image capture component to assist in mapping the scene, within the field of view, visible by the image capture component. The graphical element (e.g., a reference frame) may be generated to at least partially encompass the reference object.

Figure 10:
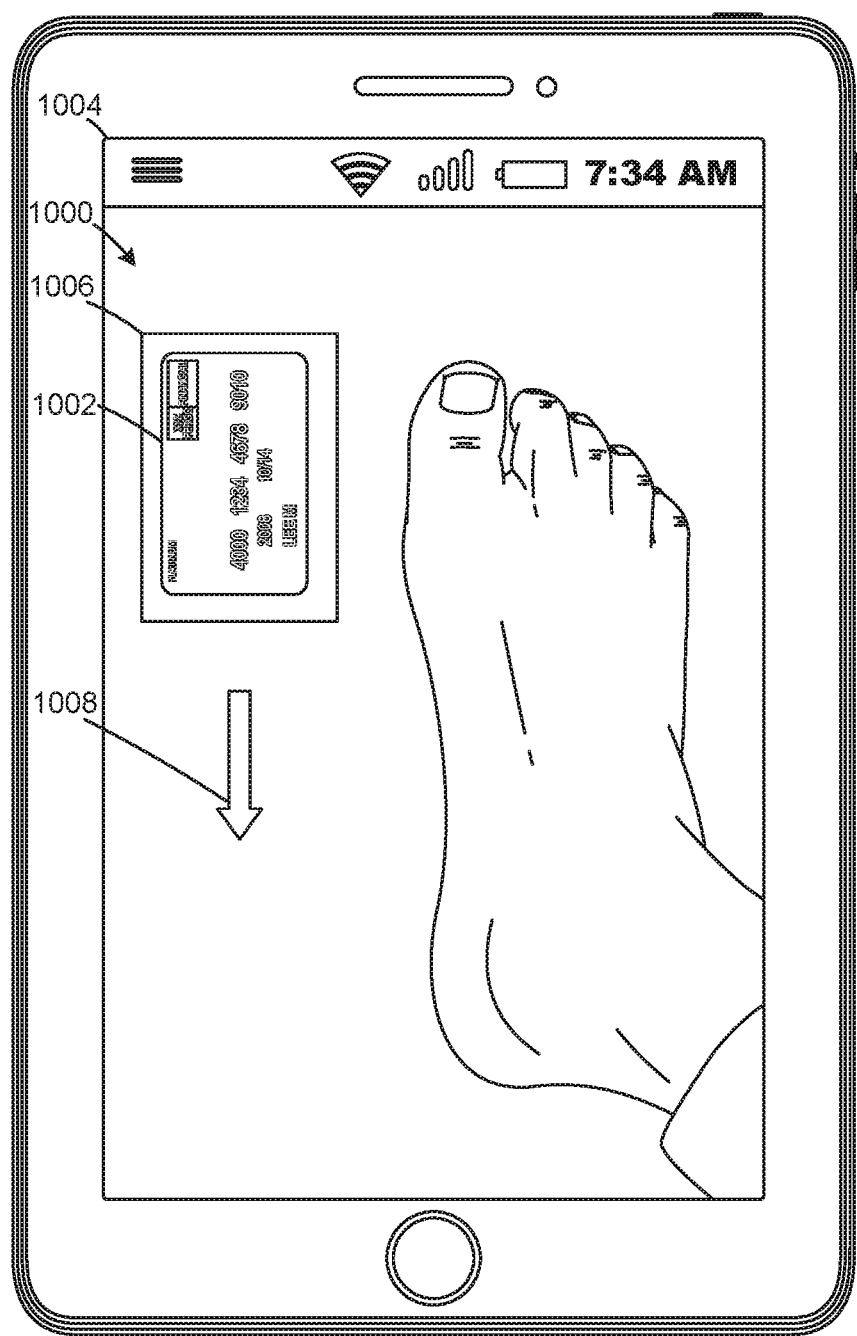
FIG. 10 is a user interface diagram depicting augmented reality elements corresponding to movements of an image capture component in initiating scene mapping for graphical model generation, according to some example embodiments.

In some embodiments, the augmentation component 260 generates the graphical element in response to identifying or receiving a selection of the reference object within a graphical user interface depicting a field of view of the image capture component of the client device 110. For example, as shown in FIG. 10, the augmentation component 260 may receive a selection (e.g., a tap, a click, an audible selection, or a biometric selection), within the graphical user interface 1000, of the reference object 1002. The user 106 of the client device 110 may tap on a portion of a display component 1004 depicting the reference object 1002. Upon receiving the selection, the augmentation component 260 generates a reference frame 1006, and the presentation component 240 causes presentation of the reference frame 1006 within the graphical user interface 1000. As noted above and shown in FIG. 10, the reference frame 1006 may be depicted as encircling or partially encircling the reference object 1002.

In some embodiments, the augmentation component 260 generates the reference frame 1006, records its coordinates and captures one or more images of the reference object, based on the identification or selection of the reference object. The user may provide input (e.g., positioning the phone, tapping the screen, audio commands, etc.) to specify the location of the reference frame 1006 thereby prescribing the image region where the reference object is located. Alternatively, the reference object may be automatically identified by applying training images or trained classifiers that may be present on the client device 110 or retrieved from a database, data structure, network resource, or any other suitable information repository accessible to the model reconstruction system 160. In some instances, the database from which the training images or trained classifiers for the reference object are retrieved are part of the third-party servers 120. The object recognition component 220 may perform identification or matching of the images to determine which images to select for inclusion in the one or more images of the reference object.

From the representation of the reference object, the augmentation component 260 generates the reference frame, encompassing or including at least a portion of the pixels associated with the reference object. In some instances, as shown in FIGS. 10-13, the reference frame 1006, 1306 is generated as a rectilinear frame encompassing the reference object 1002, 1304. Although shown as a rectangular frame in FIGS. 10-13, it should be understood that the shape and size of the reference frame may correspond to a shape and size of the reference object.

The characteristics for the reference object, extracted from the one or more images, may comprise one or more of a statistical descriptor, a spectral descriptor, features, and signatures. The statistical descriptors comprise intensity histograms, moments, and other suitable data relating to a visual depiction of the reference object. The spectral descriptors may comprise Fourier coefficients, wavelets, and other spectral information. The features may correspond to Binary Robust Invariant Scalable Keypoints (BRISK) features, Features from Accelerated Segment Test (FAST) features, Binary Robust Independent Elementary Features (BRIEF) features, Oriented FAST and rotated BRIEF (ORB) features, or other suitable features. Signatures may include cluster information such as dominant intensity clusters, as described above.

The reference frame may be automatically positioned using one or more characteristics distinguishing the reference frame from a background of the field of view or the reference plane. For example, the augmentation component 260 may determine one or more characteristics of an area of the frame of view over which the reference frame is to be depicted. The characteristics used to segment thereby positioning the reference frame over the reference object using any of the characteristics detailed above or any other discriminative characteristic to distinguish the reference object from background (everything else in the image). For example, where the background, within the field of view over which the reference frame is to be overlayed, is primarily brown, the augmentation component 260 may select a green, white, or blue color patch to be the reference object and place the reference frame on top of it.

In certain embodiments, an object may be scanned on a planar surface. The reconstruction component 270 or the pose estimation component 250 may perform plane detection to separate the scene into floor and above-floor objects. From the above-floor objects, the object being scanned can be detected. An operation to make the object water-tight may be performed. The plane detection may be done by generating a point cloud from features detected in the scene as output of the pose estimation component 250 (e.g., features generated during SLAM or depth measurements) or as output of the reconstruction component 270 and estimating the points belonging to the planar surface by using RANSAC or its variant to establish an equation for the plane in the world coordinates. Output of the pose estimation component 250 or the reconstruction component 270, may include a set of calibrated cameras, meaning camera parameters, position, and orientation are known and a set of associated images. If in at least one of the images, a reference object is segmented, its coordinates on the planar surface or any other image can be computed. Dimensions of the reference object may be available allowing absolute scale of the scene to be determined; alternatively, scale may be determined by having a plurality of cameras or a depth sensor on board.

In some embodiments, upon selecting the one or more images, the object recognition component 220 identifies the image region containing the reference object from the one or more images using a classifier (e.g., neural network or support vector machine) or by optimizing an appearance-based energy for the reference object. The object recognition component 220 may initialize a rectangular image region by segmenting out the reference object in the image and then identify the optimal rigid transformation of the rectangular frame that optimizes an Earth Mover's Distance (EMD), a Chan-Vese energy, or another appearance-based energy. In the one or more image captured of the reference object, the object recognition component 220 extracts a representation of an appearance of the reference object. Once segmented, the reference object may be used to determine absolute scale (e.g., in units of millimeters) for the three-dimensional model reconstructed by the model reconstruction system 160.

In embodiments employing the EMD, the object recognition component 220 may identify one or more histograms for the reference object, in an image captured by the image capture component of the client device 110. The object recognition component 220 may then identify one or more histograms for the retrieved images associated with the reference object. Once the object detection component 220 has a plurality of histograms, the object recognition component 220 generates a signature for each histogram of the plurality of histograms. A signature may be understood as variably sized descriptions of a histogram. Signatures may be generated from histograms by isolating and extracting clusters from a histogram (e.g., dominant clusters) which contain a number of pixels associated with a specified color. The clusters are represented in a signature by a center point of the cluster and a weight value, denoting a size of the cluster. Once the object recognition component 220 generates the signatures for the plurality of histograms, the object recognition component 220 determines the EMD value between signatures. The EMD may represent a distance or difference between two signatures and a solution to a transport problem indicating a minimal cost for transforming a first signature into a second signature.

In some instances, upon successfully identifying the reference object or matching the reference object to a retrieved image, the object recognition component 220 stores the retrieved image into an object database accessible by the model reconstruction system 160. The object database may include segmented versions of retrieved images as positive examples for previously identified reference objects. In some embodiments, the object database may also include negative examples, such as portions of textures, patterns, or colors, determined to be non-reference object examples. Such non-reference object examples may be used as negative examples. From the object database, a portion of the object recognition component 220 may be trained as a classifier to automatically detect specified types of reference objects, such as credit cards. Once trained, the object recognition component 220 may employ the classifier to modify operation 920. For example, the object recognition component 220 may use the classifier to automatically detect a reference object, prior to or without selection of the reference object, as described above. In some instances, the classifier speeds identification of the reference object and generation of the reference frame, based on known parameters of reference objects known to the classifier.

In operation 930, the trajectory selection component 230 selects an initialization path for the graphical element. In some embodiments, the initialization path includes one or more position changes of the image capture component relative to the reference object. In some embodiments, the initialization path may be selected as a single movement direction for the image capture component of the client device 110. As shown in FIG. 10, upon selection of the initialization path, the augmentation component 260 generates a movement indicator 1008 and the presentation component 240 may cause presentation of the movement indicator 1008 within the graphical user interface 1000 presented on the display component 1004 of the client device 110. The movement indicator 1008 may correspond to a direction of the initialization path. Although the figure depicts the movement indicator 1008, in some embodiments, the trajectory selection component 230 selects the initialization path and the augmentation component 260 modifies the graphical user interface 1000 in a manner suitable to instruct the user to move the client device 110, as described in more detail below.

In operation 940, the augmentation component 260 generates movement of the reference frame across a display component of the client device 110. In some embodiments, the movement of the reference frame corresponds to the initialization path selected in operation 930. In some instances, in addition to movement of the reference frame across the display component, the augmentation component 260 may generate a textual, audible, or haptic feedback or instructions. Where the augmentation component 260 generates instructions, the instructions may advise the user to maintain the reference object within the reference frame while the reference frame is moving. Maintaining the reference object within the reference frame may be performed by moving the client device 110 in a manner described by the instructions. The feedback may indicate deviation from the initialization path, speed of the initialization path or movement, a notification to start over, a pause notification, a resume notification, or any other suitable feedback.

Figure 11:
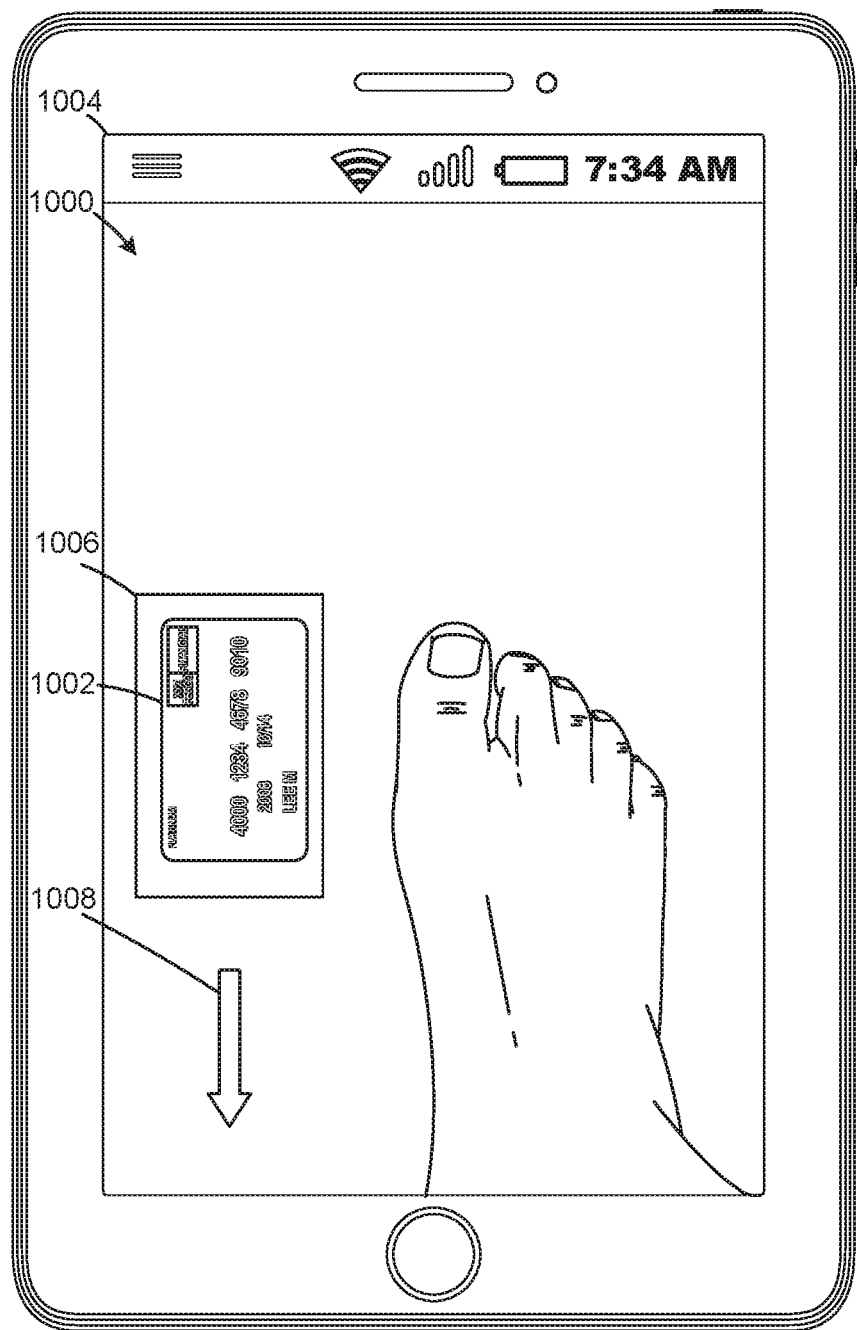
FIG. 11 is a user interface diagram depicting augmented reality elements corresponding to movements of an image capture component in initiating scene mapping for graphical model generation, according to some example embodiments.
Figure 12:
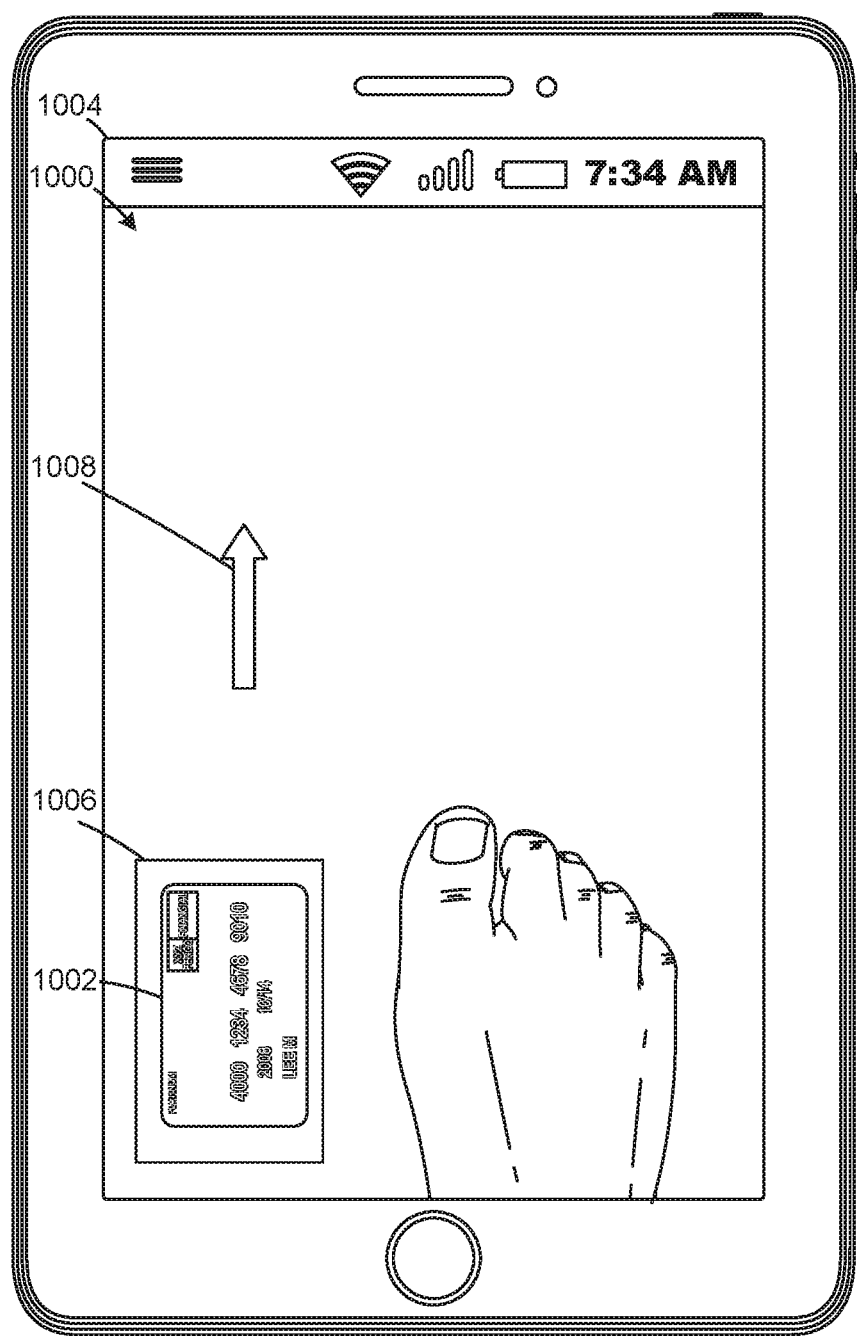
FIG. 12 is a user interface diagram depicting augmented reality elements corresponding to movements of an image capture component in initiating scene mapping for graphical model generation, according to some example embodiments.

As shown in FIGS. 10-12, the augmentation component 260, in cooperation with the presentation component 240, modifies a position of the reference frame 1006. The augmentation component 260 and the presentation component 240 may modify the position of the reference frame 1006 by progressively changing one or more of a color, a hue, a saturation value, or other suitable aspect of pixels along the initialization path. In such instances, the reference frame 1006 appears to traverse the display component 1004 in a translational motion. In some embodiments, the presentation component 240 causes presentation of one or more instructions indicating that, while the reference frame 1006 is in motion, the user 106 is to move the client device 110 in such a manner that the reference object 1002 is maintained within the reference frame 1006. For example, as shown in FIG. 10, a first position of the reference object 1002 and the reference frame 1006 is depicted on the display component 1004. The augmentation component 260 and the presentation component 240 cause the reference frame 1006 to move from the first position to a second position along the initialization path, as shown in FIG. 11. Once the reference frame 1006 and the reference object 1002 traverse a movement threshold, such as a predetermined distance within the graphical user interface 1000 or achieving the second position, the augmentation component 260 and the presentation component 240 may cause the reference frame 1006 to move from the second position to a third position along the initialization path, along a portion of the initialization path, or along a subsequent or second initialization path, as shown in FIG. 12. In some embodiments, the augmentation component 260 and the presentation component 240 continue to cause the reference frame 1006 to move within the graphical user interface 1000 until a threshold level of movement has been achieved for the image capture component of the client device 110.

Figure 13:
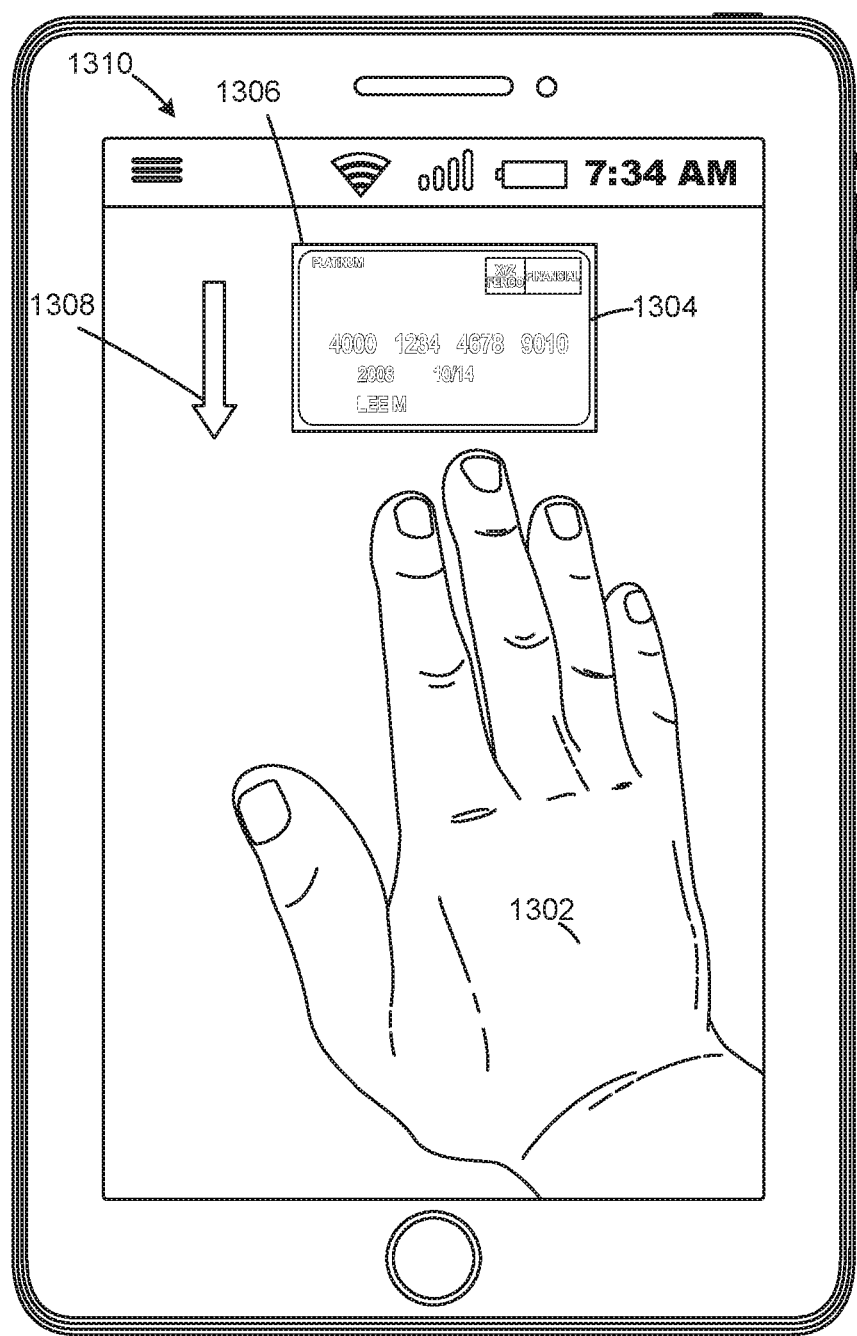
FIG. 13 is a user interface diagram depicting augmented reality elements corresponding to movements of an image capture component in initiating scene mapping for graphical model generation, according to some example embodiments.

Although FIGS. 10-12 show a reference frame moving in a vertical direction on the display component 1004 and with the reference object 1002 and the reference frame 1006 positioned beside and proximate to the object to be modeled (i.e., the foot), it should be understood that other objects, such as a hand, a toy, a shape, or any other physical object, may similarly be modeled and used in initialization procedures. As shown in FIG. 13, the object 1302 is a hand, a reference object 1304 is positioned proximate to a distal end of the object 1302, and a reference frame 1306 is positioned around the reference object 1304. Although the initialization path is depicted using a movement indicator 1308 pointing in a direction of a vertical axis of a display component 1310 of the client device 110, it should be understood that the initialization path may be depicted using any suitable indicator and may correspond to any suitable direction. For example, the movement indicator 1308 may correspond to movement along a horizontal axis of the display component 1310, a diagonal axis, moving at an angle relative to the object 1302 and the reference object 1304, along a vertical path relative to the object 1302 and the reference object 1304, or any other suitable path.

In operation 950, the pose estimation component 250 identifies the position of the image capture component relative to the object and the reference object. In some embodiments, as described in more detail below, the pose estimation component 250 identifies the position of the image capture component relative to the object, a reference plane, and the reference object.

Figure 14:
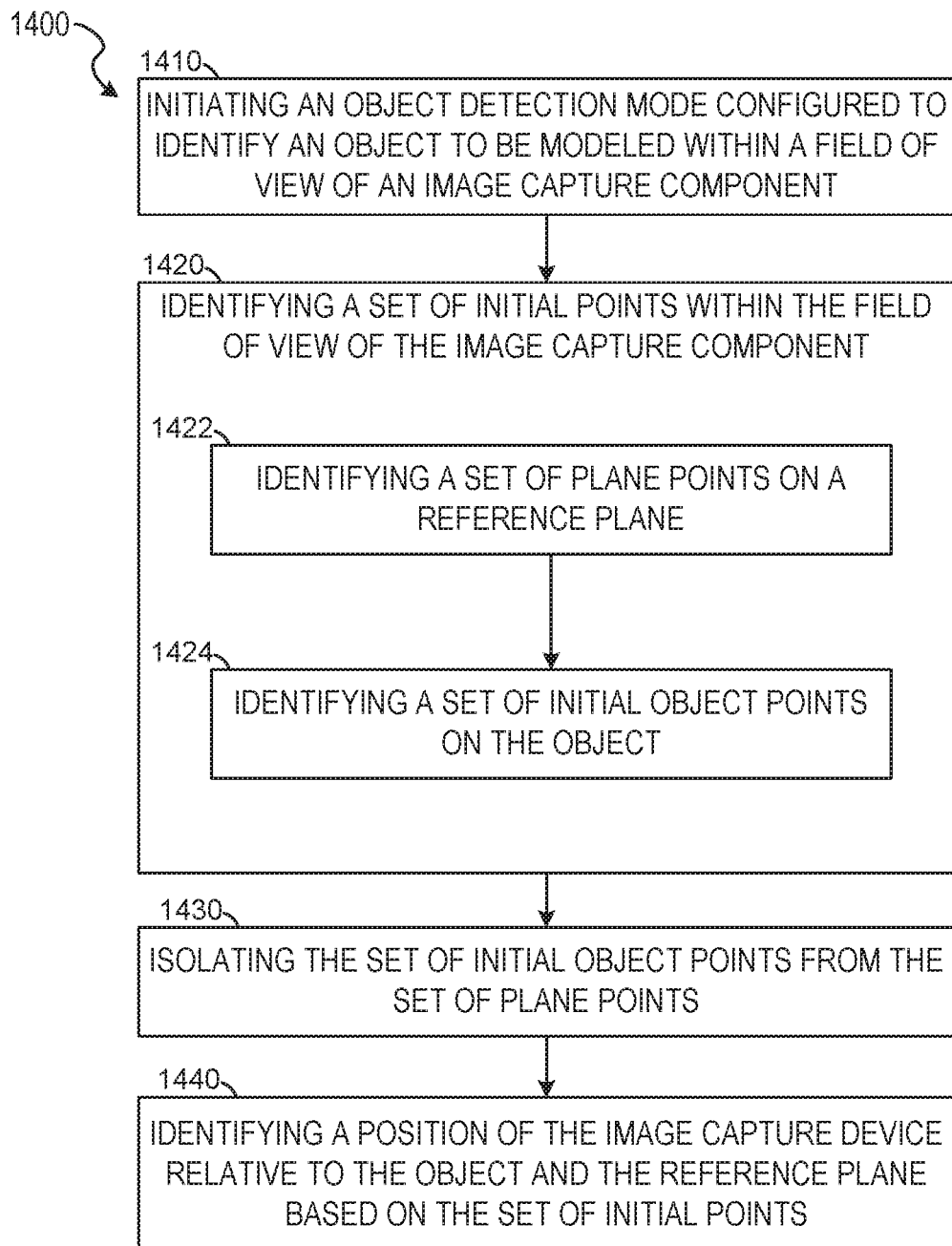
FIG. 14 is a flow diagram illustrating an example method for object modeling using augmented reality, according to some example embodiments.

FIG. 14 depicts a flow diagram illustrating an example method 1400 for reconstructing an object using augmented reality. The operations of method 1400 may be performed by components of the model reconstruction system 160. In some instances, certain operations of the method 1400 may be performed using one or more operations of the method 300 or the method 900 or as sub-operations of one or more operations of the method 300 or the method 900, as will be explained in more detail below.

In operation 1410, the application component 210 initiates an object detection mode within the client device 110. The object detection mode may be configured to identify an object to be modeled within the field of view of the image capture component. In some embodiments, the application component 210 initiates the object detection mode in a manner similar to or the same as described above with respect to operation 910.

In operation 1420, the pose estimation component 250 identifies a set of initial points within the field of view of the image capture component. The scanning scene may be set up such that the scene is made up of surfaces with known geometries. In some embodiments, the set of initial points correspond to the object and a reference plane (e.g., a reference geometry). The set of initial points may be identified in a manner similar to or the same as described above with respect to operation 350.

Figure 15:
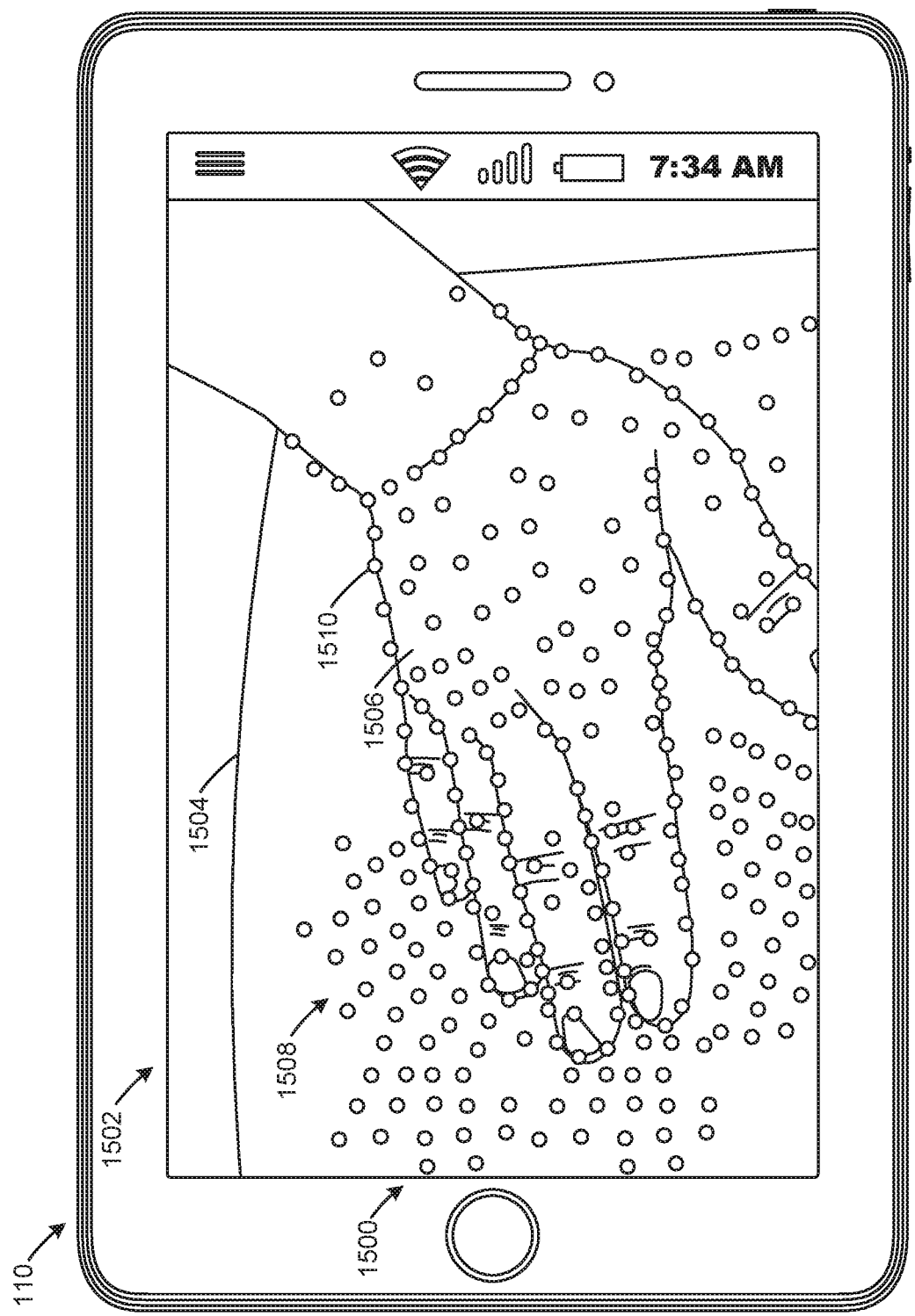
FIG. 15 is a user interface diagram depicting initial points detected on a reference plane and an object, according to some example embodiments.
Figure 16:
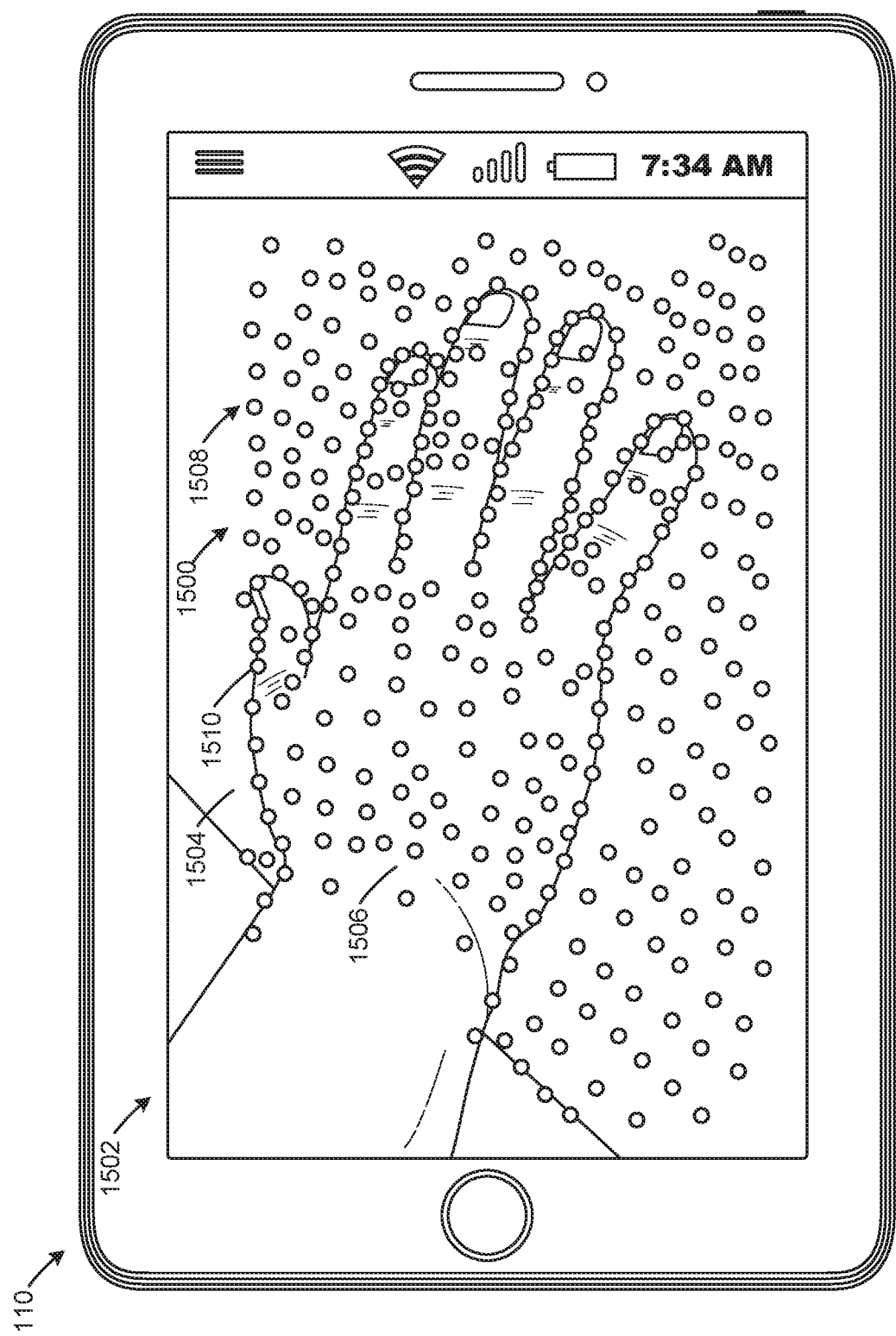
FIG. 16 is a user interface diagram depicting initial points detected on a reference plane and an object, according to some example embodiments.

As shown in FIGS. 15-16, a set of initial points 1500 are represented by individual dots or circles. Although shown as depicted within a graphical user interface 1502, the set of initial points 1500 may be hidden from view while being detected. As shown, a portion of the set of initial points 1500 are positioned on a surface of a reference plane 1504 and a portion of the initial points are positioned on a surface of an object 1506. The reference plane 1504 may be positioned proximate to the object 1506 to be modeled. In some instances, the reference plane 1504 extends outwardly from the object 1506 such that at least a portion of the reference plane 1504 is visible to the image capture component and a portion of the reference plane 1504 is obscured by the object 1506.

In some embodiments, the operation 1420 comprises one or more sub-operations. In operation 1422, the pose estimation component 250 identifies a set of plane points. The set of plane points may mark, represent, or be associated with distinguishable aspects, markings, textures, changes in height, or other characteristics of the reference plane. For example, variations in color of a wood grain on a wooden floor may correspond to feature points which are distinguishable from other aspects or points within the scene.

The set of plane points may correspond to a number of points suitable to determine an equation defining the reference plane, such as by singular value decomposition, RANSAC, or a variant of RANSAC. In embodiments where the pose estimation component 250 uses one or more RANSAC operations, the pose estimation component 250 may initially determine a reference plane equation, indicating one or more of a position and slope of the reference plane, using a first subset of points of the set of initial points and possibly data from onboard sensors (e.g., IMU) found on the client device 110. The first subset of points may correspond to a minimum point threshold representing a minimum number of points from which the reference plane equation may be generated. Based on the reference plane equation determined by the pose estimation component 250, using the first subset of points, the pose estimation component 250 may incorporate one or more additional points of the set of plane points. The one or more additional points may be points of the set of plane points which correspond to a position expected from the reference plane equation. Once the pose estimation component 250 incorporates a number of plane points above a predetermined threshold, the pose estimation component 250 may select the reference plane equation and the associated plane points to form a mathematical representation of the reference plane (e.g., triangular mesh). As shown in FIGS. 15-16, a set of plane points 1508 are represented by individual dots among the set of initial points 1500. The plane points 1508 may be identified within, as a portion of, or as a subset of the set of initial points 1500.

In operation 1424, the pose estimation component 250 identifies a set of initial object points on the object (e.g., points positioned on or proximate to a surface or surfaces of the object). In some embodiments, the set of initial object points may be identified in a manner similar to or the same as described above with respect to operation 350. In some instances, the pose estimation component 250 identifies the set of initial object points as a subset of points of the set of initial points which do not correspond to the reference plane. The pose estimation component 250 may identify the set of initial object points as a subset of points positioned a distance away from the set of plane points or an expected position corresponding to the reference plane equation. The distance may be a predetermined threshold distance or a dynamically determined threshold distance. Where the threshold distance is dynamically determined, the threshold distance may be based on a focal length of the image capture component, the field of view of the image capture component, or any other suitable parameter of one or more of the image capture component, the field of view, a scale of the reference object, or the client device. As shown in FIGS. 15-16, a set of initial object points 1510 are represented among the set of initial points 1500. The initial object points 1510 may be identified within, as a portion of, or as a subset of the set of initial points 1500.

In operation 1430, the pose estimation component 250 isolates the set of initial object points from the set of plane points. The pose estimation component 250 may isolate (e.g., segment) the object (e.g., a foot) out of the three-dimensional model of the scene by removing surfaces corresponding to the plane (e.g., by removing the set of plane points or trimming the combined mesh) and surfaces greater than a given height above the plane; the portion of the scene (e.g., foot and leg up to the ankle) remaining may be considered to be part of the object of interest. The reconstruction component 270 may close the open surfaces of the object. It should be understood that the surfaces discussed above may be represented by a set, a subset, or any other combination of the points described above.

In some embodiments, in isolating object in the scene, the pose estimation component 250 scales the scene or a representation of the scene to known units. An absolute scale for the object may be determined by one or more image segmentation operations performed on the images captured to build the initial scene geometry (e.g., by identifying a set of initial points). In some embodiments, the image segmentation operations are performed on a reference object within the field of view of the image capture component. For example, the reference object may be a card or other object of known size, as discussed above with respect to FIGS. 9-13. As discussed above, the model reconstruction system 160 may identify the reference object in the scene, identify a position or location of the reference object within the field of view, and generate a reference frame enclosing at least a portion of the reference object.

In operation 1440, the pose estimation component 250 identifies a position of the image capture device relative to the object and the reference plane based on the set of initial feature points.

Figure 17:
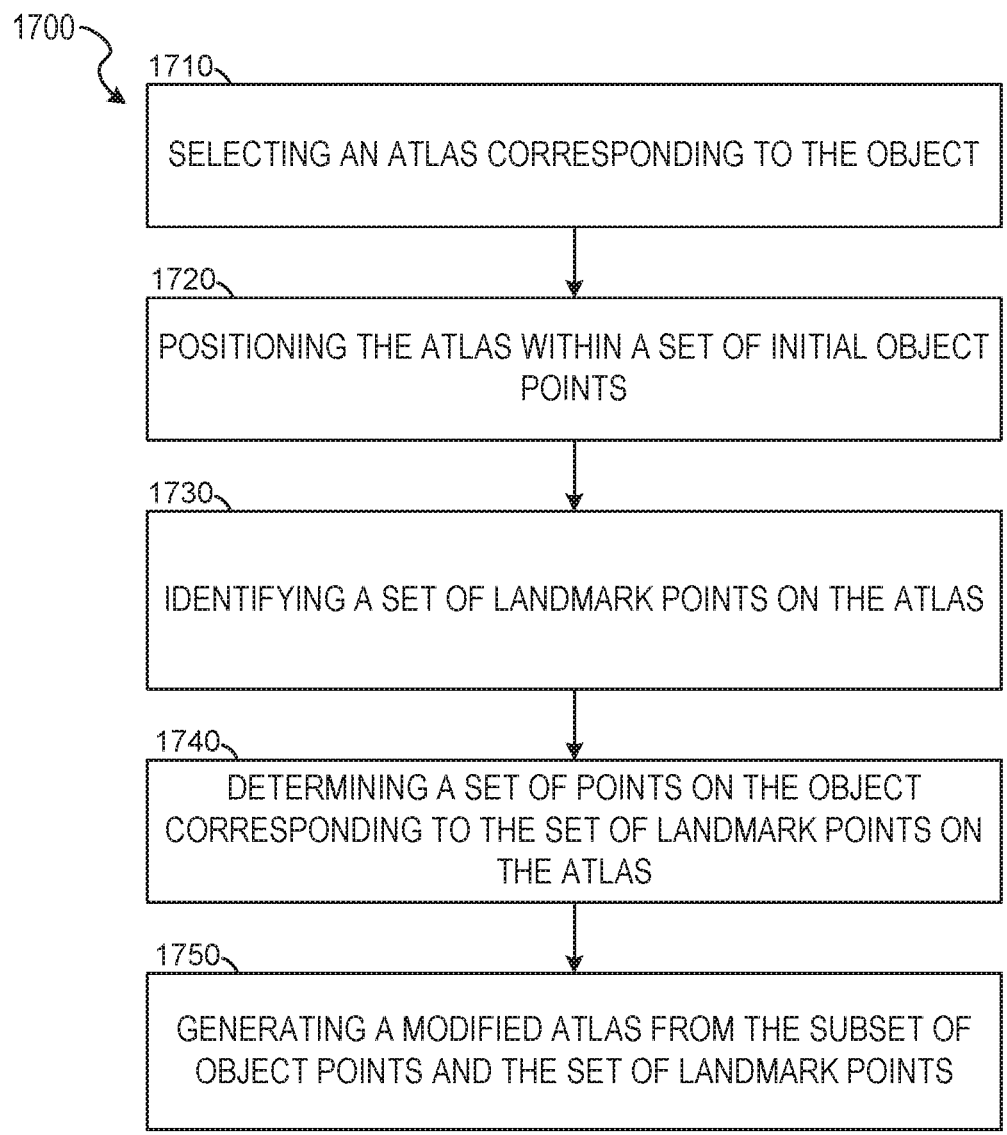
FIG. 17 is a flow diagram illustrating an example method for object modeling using augmented reality, according to some example embodiments.

FIG. 17 depicts a flow diagram illustrating an example method 1700 for reconstructing a 3D model of an object using augmented reality. The operations of method 1700 may be performed by components of the model reconstruction system 160. In some instances, certain operations of the method 1700 may be performed using one or more operations of the methods 300, 900, or 1400, or as sub-operations of one or more operations of the methods 300, 900, or 1400, as will be explained in more detail below.

In operation 1710, the object recognition component 220 or the reconstruction component 270 selects an atlas corresponding to the object. In some embodiments, the object is detected in a manner similar to or the same as described above with respect to 350 or 1430. Upon identifying or detecting the object, the reconstruction component 270 selects an atlas which approximates at least a portion of the object features (e.g., points, edges, surface geometry, colors). The atlas may be included in an atlas library or database accessible to the reconstruction component 270. The atlas database may be continually or periodically updated with additional three-dimensional models captured by the users, or any other suitable source. In some embodiments, each atlas is classified according to one or more of a shape, a categorical label or description, one or more dimensions, one or more scale, or any other suitable features or aspects of the atlas or associated object. In some embodiments, landmarks are automatically identified for each atlas based on the atlas classification. Landmarks may also be manually annotated, by locating points or approximate points corresponding to measurement locations or distinguishing features or aspects of the atlas or associated object. In some embodiments, each atlas comprises a three-dimensional model and feature locations or landmarks identified for the atlas.

The atlas may be selected which most closely matches the set of initial object points and or produces the smallest image re-projection error, as described previously. In some embodiments, the set of initial object points, being used as a sparse point cloud, may be registered to the atlas using an iterative closest point (ICP) or any other point registration algorithm. In some embodiments, the reconstruction component 270 selects the atlas using the set of initial points, described above with respect to the method 1400. The reconstruction component 270 may compare one or more points, distances extending between one or more points, or surface distances between the three-dimensional model or point set generated during any step of the reconstruction to an atlas from a processor-readable storage medium, such as a database or memory, containing a plurality of atlases. For example, in some embodiments, the reconstruction component 270 estimates a shape or surface for the object from the set of initial object points. The reconstruction component 270 then compares the estimated shape or surface to atlases within the database, and selects an atlas having a surface or portion of a surface which corresponds to or at least partially matches the estimated shape or surface of the object.

In operation 1720, the augmentation component 260 positions the atlas within the scene. The augmentation component 260 may position the atlas within the set of initial object points such that the atlas is at least partially inside the set of initial object points. In some embodiments, the augmentation component 260 aligns the atlas with the set of initial object points by computing an optimal (e.g., a theoretically optimal) rigid transformation for the atlas based on the set of initial object points. In other embodiments, the rigid transformation may be computed to minimize an image re-projection error of one or more images captured during detection of the set of initial object points.

In operation 1730, as the model reconstruction system 160 begins constructing the model, the reconstruction component 270 identifies a set of landmark points on the atlas. A plurality of landmark points may be known or predetermined for each atlas and associated with the atlas in the database. The model reconstruction system 160 may automatically identify the landmark points on a reconstructed three-dimensional model from the plurality of landmark points associated with an atlas; for example, the model reconstruction system 160 may align an atlas, as presented above, to the reconstructed point cloud or the three-dimensional model of the object and select the set of landmark points on the surface of the object that are proximate to the atlas landmarks.

In some embodiments, to select the set of landmark points of the set of object points, the reconstruction component 270 aligns or otherwise compares the set of object points or an initial three-dimensional model representing object to a plurality of atlases retrieved from the atlas database. The alignment or comparison may be an affine alignment, such that similarities determined among the plurality of atlases and the set of object points may be preserved or may be non-rigid. The set of landmark points for an incoming reconstruction may be localized based on the comparison of the object model (points or three-dimensional model) to the plurality of atlases. For example, the reconstruction component 270 may perform a probabilistic analysis of the set of object points, fusing predictions of specified object points as corresponding to landmark points. Predictions, associated with atlases having comparatively higher similarity to the set of object points, may be weighted to provide a higher contribution to a fused, identified set of landmark points based on the probabilistic analysis.

In operation 1740, the reconstruction component 270 determines locations of the landmarks on the object. In some embodiments, the subset of object points corresponds to the set of landmark points on the atlas. The reconstruction component 270 may determine the subset of object points based on a proximity of each object point to a landmark point of the atlas. The reconstruction component 270 may determine the subset of object points using the probabilistic analysis described above with respect to operation 1730. In some instances, the reconstruction component 270 determines the subset of object points as identifiable points within the set of object points which correspond to expected points for the object. For example, where the selected atlas is a foot, the reconstruction component 270 may select object points, for inclusion in the subset of object points, which are located along a plane parallel to the reference plane and at opposing ends of the set of object points. Such selected object points may correspond to points detected for a heel, a tip of one or more toes, and opposing sides of the foot extending between the heel and toes.

In operation 1750, the reconstruction component 270 generates a modified atlas from the subset of object points by refining the set of landmark points initialized by an atlas on the surface of the object being reconstructed. In some embodiments, the reconstruction component 270 refines the landmark points labeled on the object of interest using an atlas, or a portion thereof, based on the surface of the object. For example, the reconstruction component 270 may maintain one or more ratios or proportions of the atlas in order to prevent deformation of the atlas. In such instances, the reconstruction component 270 may reposition the landmarks while maintaining a proportion of two or more dimensions. The dimensions may extend between initially placed landmark points. The reconstruction component 270 may position the landmarks, starting from positions obtained using a registered atlas(es), more precisely by refining or repositioning identified landmark points on a surface of the object such that the identified landmark points lie on a local maximum or a local minimum of a surface curvature around the landmark.

Figure 18:
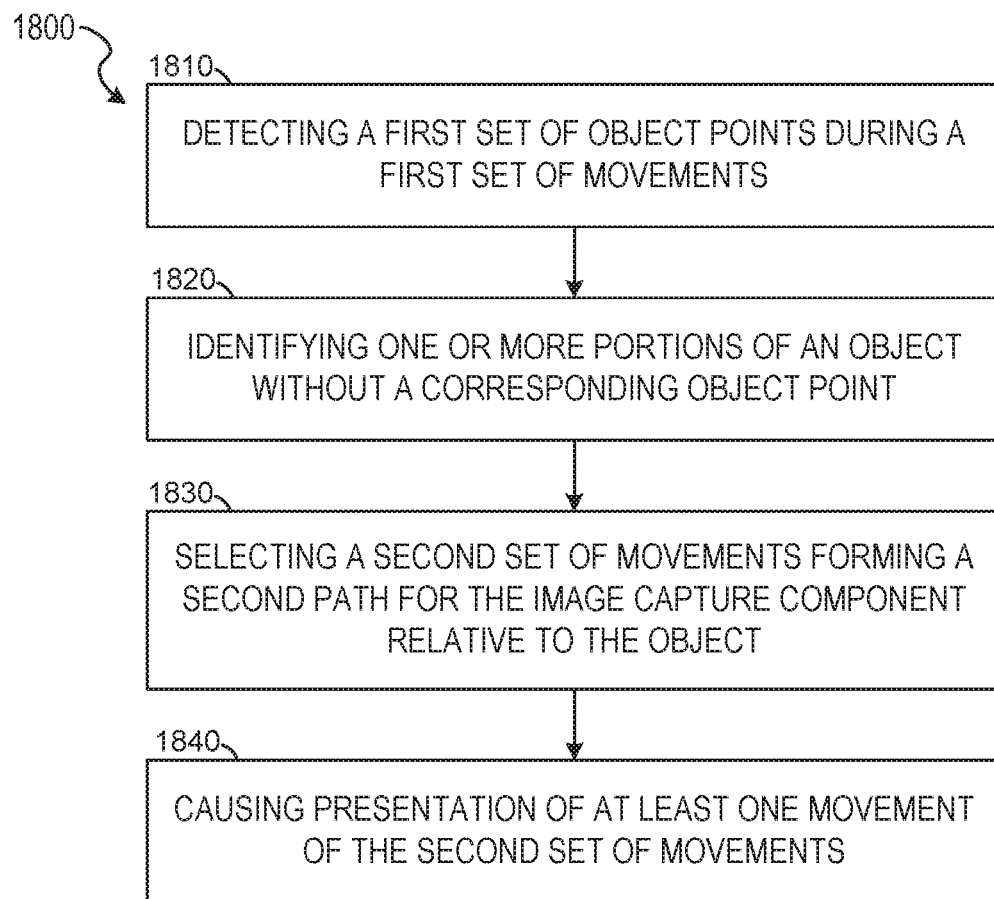
FIG. 18 is a flow diagram illustrating an example method for object modeling using augmented reality, according to some example embodiments.

FIG. 18 depicts a flow diagram illustrating an example method 1800 for reconstructing a three-dimensional model of an object using augmented reality. The operations of method 1800 may be performed by components of the model reconstruction system 160. In some instances, certain operations of the method 1800 may be performed using one or more operations of the methods 300, 900, 1400, or 1700 or as sub-operations of one or more operations of the methods 300, 900, 1400, or 1700, as will be explained in more detail below.

In operation 1810, the pose estimation component 250 detects a first set of object points. The first set of object points may be detected during a first set of movements. In some embodiments, the first set of object points may be a portion of the set of object points detected in operation 350. While the first set of object points are being detected, the augmentation component 260 modifies a graphical depiction of a portion of the object corresponding to at least a portion of the first set of object points.

In operation 1820, while detecting the first set of object points, the pose estimation component 250 identifies one or more portions of the object without sufficient support (e.g., missing depth information, insufficient object points, or too few images of an object surface), which correspond or may correspond to unmodified portions of the graphical depiction of the object. In some embodiments, the pose estimation component 250 identifies the portions of the object without corresponding object points or surfaces or with an unmodified depiction, which may correspond with one or more points or surfaces, in cooperation with the augmentation component 260. In such instances, the augmentation component 260 detects or identifies areas on a graphical depiction of the object corresponding to portions of the object for which additional views may be gathered.

In operation 1830, the trajectory selection component 230 selects a set of movements forming a path for the image capture component relative to the object. In some embodiments, after the first attempt at reconstructing the scene has been made in operation 350, the trajectory selection component 230 may determine the set of movements chosen in operation 330 did not produce sufficient data for accurate reconstruction and a second (or third, etc.) set of movements should be performed. The second set of movements may be part of a second path. In some embodiments, the second set of movements are selected based on a position of the object within the field of view, the first set of movements, and the portion of the object that was not covered by enough measurements (e.g., image, depth measurements, feature points).

In operation 1840, the presentation component 240 causes presentation of at least one movement of the second set (or third, etc.) of movements. In some embodiments, the presentation component 240 causes presentation of the second set of movements in a manner similar to or the same as described above with respect to operation 340. In some embodiments, the presentation component 240 presents each movement of the second set of movements upon detecting completion or approximate completion of a preceding movement. In some instances, the presentation component 240 presents the second set of movements interspersed or included within the first set of movements. For example, in operation 1820, the pose estimation component 250 may identify portions of the object with missing data (e.g., image, depth measurement, feature points, or object points) based on a position, angle, or orientation of the image capture component, relative to the object, deviating from an expected position, angle, or orientation in executing a movement of the first set of movements. Upon detecting the portions of the object without sufficient data or the deviation in the movement, the trajectory selection component 230 and the presentation component 240 cooperate to identify movements (e.g., the second set of movements) which properly position the image capture component to capture the missing views. At this point, the presentation component 240 may halt, pause, or otherwise interrupt presentation of the first set of movements, present the corrective movements sequentially, and resume presentation of the first set of movements after completion of the second set of movements or after obtaining the data by the pose estimation component 250.

Previous systems and methods employed fixed position imaging devices for optical or image-based scanning and reconstruction procedures. Where imaging devices were mobile, previous systems and methods used fixed path imaging devices to ensure image capture of an object in a defined, repeatable, and expected manner. Such systems often employed tutorials, lessons, or detailed instructions to train novice users in modeling with the system, distances at which to position objects relative to the imaging devices, and other scene preparation aspects. Aspects and embodiments of the present disclosure enable usage of freely movable image capture components, image capture devices, or other client devices capable of or configured to capture images of an object. Further, the present disclosure does not rely on expected object positions, known patterns, defined and expected lighting conditions, and other limiting issues of previous systems and methods.

Aspects and embodiments of the present disclosure include systems and methods for offline and online dense reconstruction of objects and surfaces within a field of view in real-time or near real-time. The present systems and methods enable measurement of objects and three-dimensional models and automated detection of landmark points, curvature, and other aspects of the objects' geometries. The systems and methods of the present disclosure present interactive, real-time or near real-time feedback and guidance to ensure capture of sufficient and high quality data (e.g., images, depth measurements, IMU readings) of an object to be reconstructed. In some aspects and embodiments, the guidance or feedback is presented in real-time and provided in augmented reality interfaces in graphical, audio, or haptic forms.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 19:
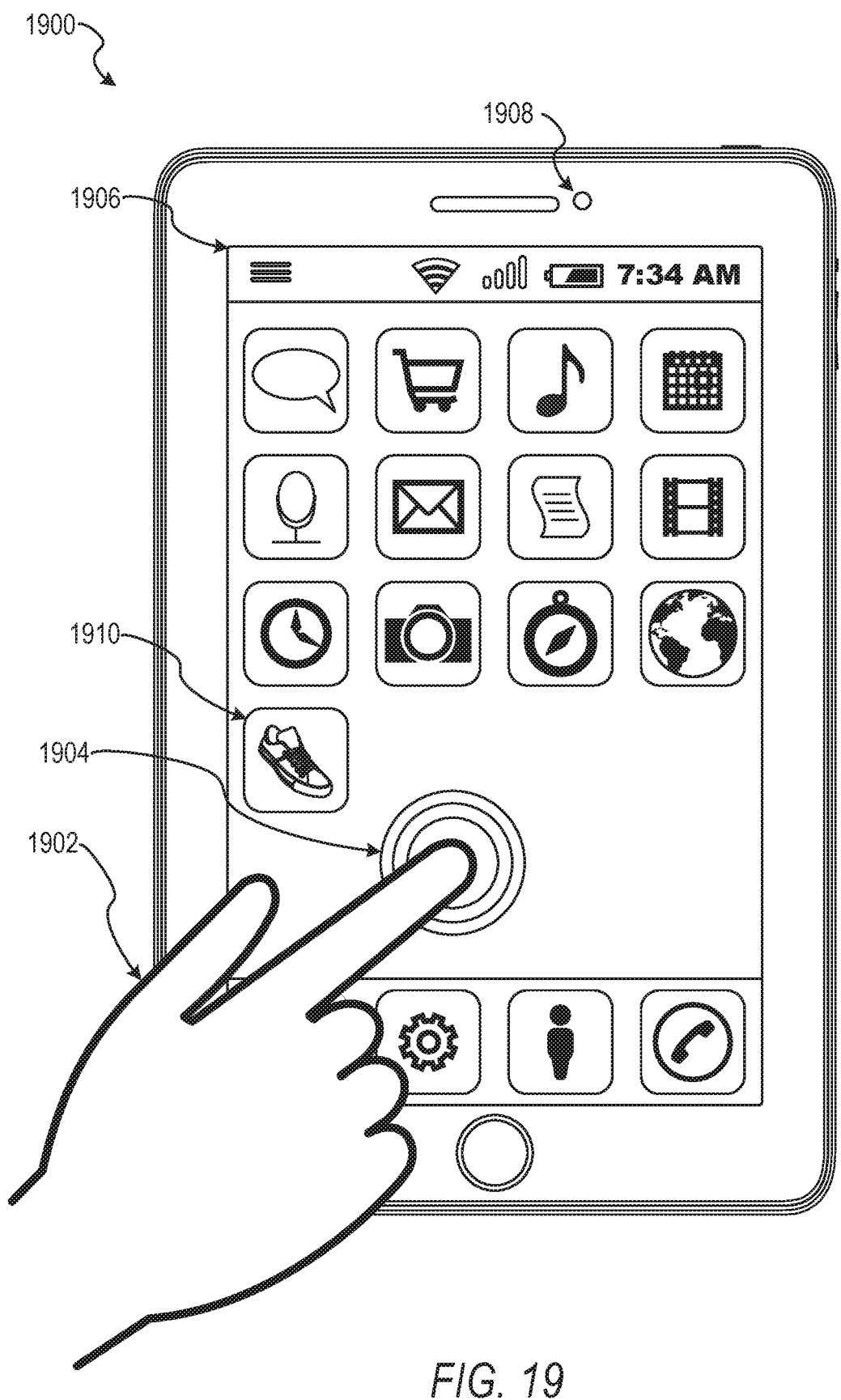
FIG. 19 is a user interface diagram depicting an example mobile device and mobile operating system interface, according to some example embodiments.

FIG. 19 illustrates an example mobile device 1900 executing a mobile operating system (e.g., IOS™, ANDROID™, WINDOWS® Phone, or other mobile operating systems), consistent with some embodiments. In one embodiment, the mobile device 1900 includes a touch screen operable to receive tactile data from a user 1902. For instance, the user 1902 may physically touch 1904 the mobile device 1900, and in response to the touch 1904, the mobile device 1900 may determine tactile data such as touch location, touch force, or gesture motion. In various example embodiments, the mobile device 1900 displays a home screen 1906 (e.g., Springboard on IOS™) operable to launch applications or otherwise manage various aspects of the mobile device 1900. In some example embodiments, the home screen 1906 provides status information such as battery life, connectivity, or other hardware statuses. The user 1902 can activate user interface elements by touching an area occupied by a respective user interface element. In this manner, the user 1902 interacts with the applications of the mobile device 1900. For example, touching the area occupied by a particular icon included in the home screen 1906 causes launching of an application corresponding to the particular icon.

The mobile device 1900, as shown in FIG. 19, includes an imaging device 1908. The imaging device 1908 may be a camera or any other device coupled to the mobile device 1900 capable of capturing a video stream or one or more successive images. The imaging device 1908 may be triggered by the model reconstruction system 160 or a selectable user interface element to initiate capture of a video stream or succession of images and pass the video stream or succession of images to the model reconstruction system 160 for processing according to the one or more methods described in the present disclosure.

Many varieties of applications (also referred to as "apps") can be executing on the mobile device 1900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1900 includes a messaging app, an audio recording app, a camera app, a book reader app, a media app, a file management app, a location app, a browser app, a settings app, a contacts app, a telephone call app, or other apps (e.g., gaming apps, social networking apps, biometric monitoring apps). In another example, the mobile device 1900 includes a model manipulation app 1910 that, consistent with some embodiments, allows users to model objects, manipulate and compare models, and transfer or transmit models to other devices or users. In this example, the model manipulation app 1910 can incorporate aspects of embodiments described herein. For example, in some embodiments the model manipulation app 1910 includes a gallery of previously generated models created, by the model reconstruction system 160, for users of the model manipulation app 1910. These galleries may consist of mobile or static models, statistical or numerical representations of models, videos or pictures captured during the object modeling process, or any other suitable media. Any of these environments or platforms may be used to implement concepts of the present inventive subject matter.

Software Architecture

Figure 20:
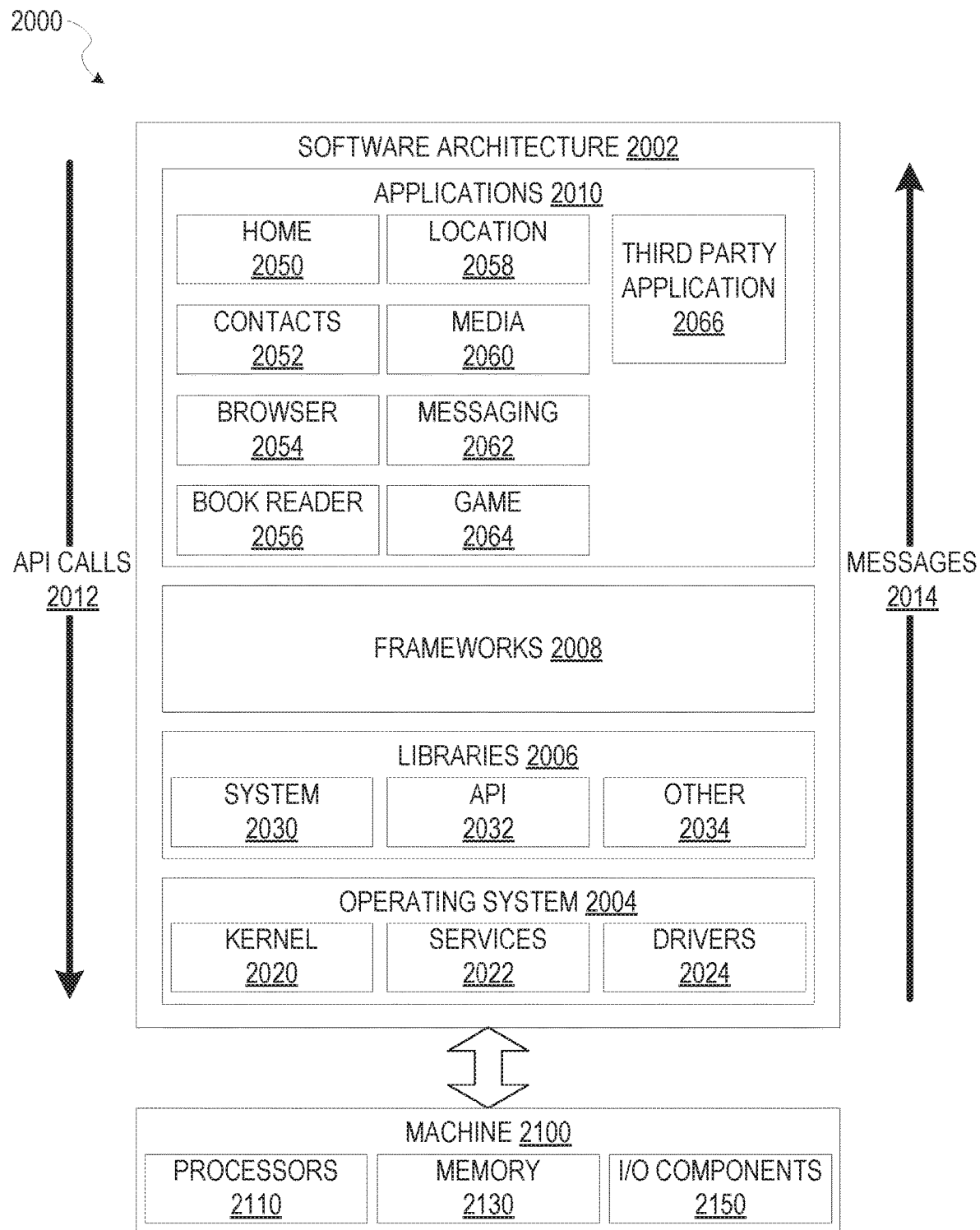
FIG. 20 is a block diagram illustrating an example of a software architecture that may be installed on a machine, according to some example embodiments.

FIG. 20 is a block diagram 2000 illustrating an architecture of software 2002, which can be installed on the devices described above. FIG. 20 is merely a non-limiting example of a software architecture, and it will be appreciated that many other architectures can be implemented to facilitate the functionality described herein. In various embodiments, the software 2002 is implemented by hardware such as machine a 2100 of FIG. 21 that includes processors 2110, memory 2130, and I/O components 2150. In this example architecture, the software 2002 can be conceptualized as a stack of layers where each layer may provide a particular functionality. For example, the software 2002 includes layers such as an operating system 2004, libraries 2006, frameworks 2008, and applications 2010. Operationally, the applications 2010 invoke application programming interface (API) calls 2012 through the software stack and receive messages 2014 in response to the API calls 2012, consistent with some embodiments.

In various implementations, the operating system 2004 manages hardware resources and provides common services. The operating system 2004 includes, for example, a kernel 2020, services 2022, and drivers 2024. The kernel 2020 acts as an abstraction layer between the hardware and the other software layers consistent with some embodiments. For example, the kernel 2020 provides memory management, processor management (e.g., scheduling), component management, networking, and security settings, among other functionality. The services 2022 can provide other common services for the other software layers. The drivers 2024 are responsible for controlling or interfacing with the underlying hardware, according to some embodiments. For instance, the drivers 2024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 2006 provide a low-level common infrastructure utilized by the applications 2010. The libraries 2006 can include system libraries 2030 (e.g., C standard library) that can provide functions such as memory allocation functions, string manipulation functions, mathematic functions, and the like. In addition, the libraries 2006 can include API libraries 2032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2006 can also include a wide variety of other libraries 2034 to provide many other APIs to the applications 2010.

The frameworks 2008 provide a high-level common infrastructure that can be utilized by the applications 2010, according to some embodiments. For example, the frameworks 2008 provide various graphic user interface (GUI) functions, high-level resource management, high-level location services, and so forth. The frameworks 2008 can provide a broad spectrum of other APIs that can be utilized by the applications 2010, some of which may be specific to a particular operating system or platform.

In an example embodiment, the applications 2010 include a home application 2050, a contacts application 2052, a browser application 2054, a book reader application 2056, a location application 2058, a media application 2060, a messaging application 2062, a game application 2064, and a broad assortment of other applications such as a third-party application 2066. According to some embodiments, the applications 2010 are programs that execute functions defined in the programs. Various programming languages can be employed to create the applications 2010, structured in a variety of manners, such as object-oriented programming languages (e.g., Objective-C, Java, or C++) or procedural programming languages (e.g., C or assembly language). In a specific example, the third-party application 2066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third-party application 2066 can invoke the API calls 2012 provided by the operating system 2004 to facilitate functionality described herein.

Example Machine Architecture and Machine-Readable Medium

Figure 21:
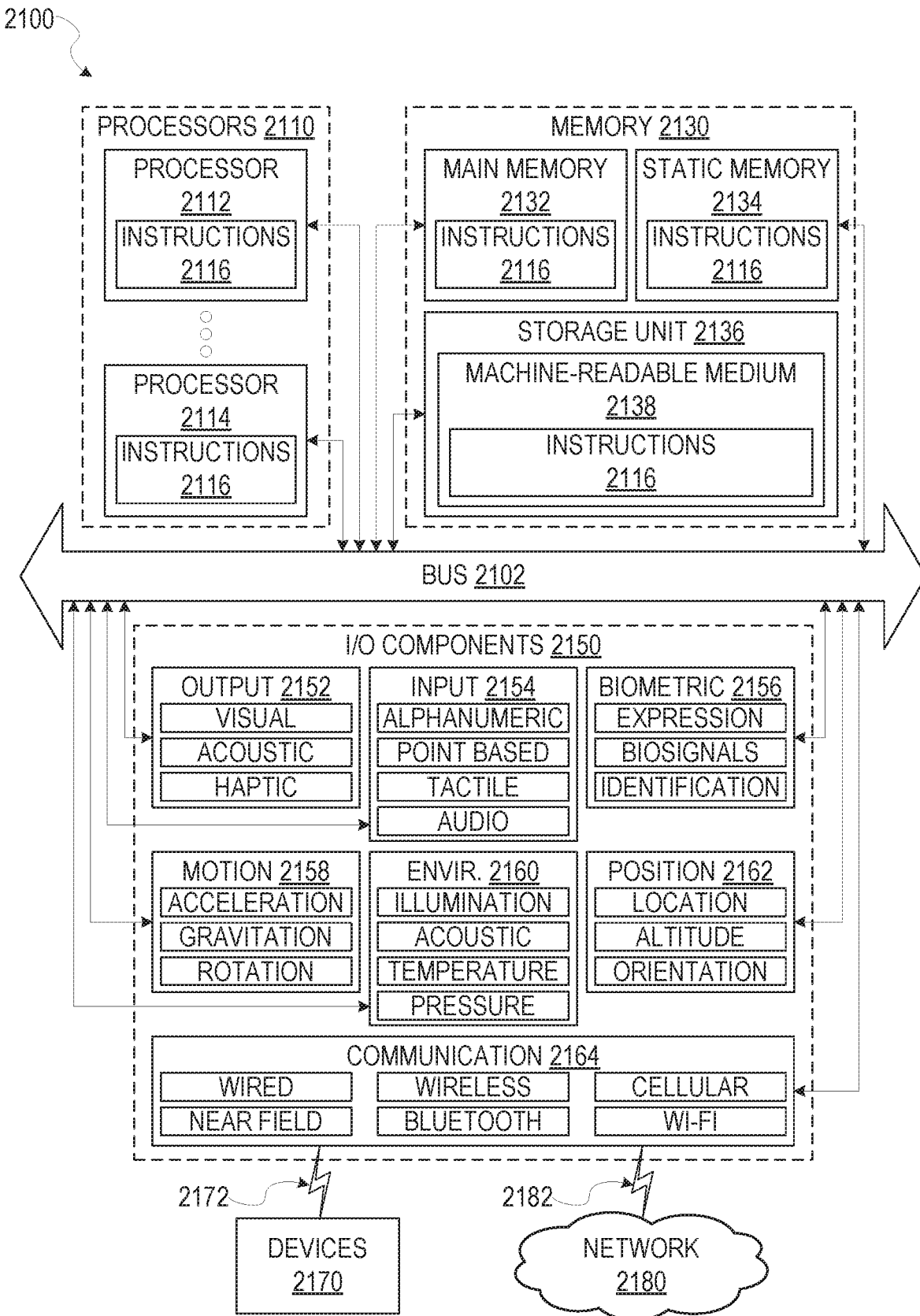
FIG. 21 is a block diagram presenting a diagrammatic representation of a machine in the form of a computer system within which a set of instructions may be executed for causing the machine to perform any of the methodologies discussed herein, according to an example embodiment.

FIG. 21 is a block diagram illustrating components of a machine 2100, according to some embodiments, able to read instructions (e.g., processor-executable instructions) from a machine-readable medium (e.g., a non-transitory processor-readable storage device) and perform any of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any of the methodologies discussed herein can be executed. In alternative embodiments, the machine 2100 operates as a standalone device or can be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any of the methodologies discussed herein.

In various embodiments, the machine 2100 comprises processors 2110, memory 2130, and I/O components 2150, which can be configured to communicate with each other via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 2112 and a processor 2114 that may execute the instructions 2116. The term "processor" is intended to include multi-core processors that may comprise two or more independent processors (also referred to as "cores") that can execute instructions 2116 contemporaneously. Although FIG. 21 shows multiple processors 2110, the machine 2100 may include a single processor with a single core, a single processor with multiple cores (e.g., a multi-core processor), multiple processors with a single core, multiple processors with multiples cores, or any combination thereof.

The memory 2130 comprises a main memory 2132, a static memory 2134, and a storage unit 2136 accessible to the processors 2110 via the bus 2102, according to some embodiments. The storage unit 2136 can include a machine-readable medium 2138 on which are stored the instructions 2116 embodying any of the methodologies or functions described herein. The instructions 2116 can also reside, completely or at least partially, within the main memory 2132, within the static memory 2134, within at least one of the processors 2110 (e.g., within the processor's cache memory), or any suitable combination thereof, during execution thereof by the machine 2100. Accordingly, in various embodiments, the main memory 2132, the static memory 2134, and the processors 2110 are considered machine-readable media 2138.

As used herein, the term "memory" refers to a machine-readable medium 2138 able to store data temporarily or permanently and may be taken to include, but not be limited to, random-access memory (RAM), read-only memory (ROM), buffer memory, flash memory, and cache memory. While the machine-readable medium 2138 is shown in an example embodiment to be a single medium, the term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by processors of the machine 2100 (e.g., processors 2110), cause the machine 2100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 2150 include a wide variety of components to receive input, provide output, produce output, transmit information, exchange information, capture measurements, and so on. In general, it will be appreciated that the I/O components 2150 can include many other components that are not shown in FIG. 21. The I/O components 2150 are grouped according to functionality merely for simplifying the following discussion, and the grouping is in no way limiting. In various example embodiments, the I/O components 2150 include output components 2152 and input components 2154. The output components 2152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2150 include biometric components 2156, motion components 2158, environmental components 2160, or position components 2162, among a wide array of other components. For example, the biometric components 2156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 include acceleration sensor components (e.g., accelerometer), gravitation sensor components, rotation sensor components (e.g., gyroscope), and so forth. The environmental components 2160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 include a network interface component or another suitable device to interface with the network 2180. In further examples, communication components 2164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2170 may be another machine or any of a wide variety of peripheral devices (e.g., a peripheral device coupled via a Universal Serial Bus (USB)).

Moreover, in some embodiments, the communication components 2164 detect identifiers or include components operable to detect identifiers. For example, the communication components 2164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 2180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2180 or a portion of the network 2180 may include a wireless or cellular network, and the coupling 2182 may be a Code Division Multiple Access (CDMA) connection, a Global System for Mobile communications (GSM) connection, or another type of cellular or wireless coupling. In this example, the coupling 2182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2116 are transmitted or received over the network 2180 using a transmission medium via a network interface device (e.g., a network interface component included in the communication components 2164) and utilizing any one of a number of well-known transfer protocols (e.g., Hypertext Transfer Protocol (HTTP)). Similarly, in other example embodiments, the instructions 2116 are transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Furthermore, the machine-readable medium 2138 is non-transitory (in other words, not having any transitory signals) in that it does not embody a propagating signal. However, labeling the machine-readable medium 2138 "non-transitory" should not be construed to mean that the medium is incapable of movement; the medium should be considered as being transportable from one physical location to another. Additionally, since the machine-readable medium 2138 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   initiating, by one or more processors of a device having an image capture component and a display, an object modeling mode configured to capture sufficient views of an object within the field of view of the image capture component to enable generation of a three-dimensional model of the object;
   responsive to input from the image capture component, automatically selecting, by the one or more processors, a trajectory for movement of the image capture component relative to the object;
   providing, on the display, an image generally representative of at least a portion of the object and augmenting the image with a suggested movement of the image capture device in accordance with the trajectory;
   as the image capture component is moved relative to the object, automatically capturing a data stream of successive images, the images comprising one or more views of the object;
   in response to at least a portion of the data stream, dynamically modifying the image in the display and augmenting the displayed image to guide a next movement of the image capture component to capture more successive images comprising one or more additional views;
   and
   repeating the automatic capturing step and the dynamically modifying step until the data stream comprises sufficient views of the object that a three-dimensional model of the object can be generated from at least some of the captured views.

2. The method of claim 1, further comprising the steps of:
   responsive to the initiating of the object detection mode, identifying in a scene within the field of view of the image capture component at least some surfaces of the object and a reference geometry positioned proximate to the object; and
   identifying a position of the image capture component relative to the object and the reference geometry.

3. The method of claim 2, further comprising the steps of:
responsive to the initiating of the object detection mode, generating a graphical element for a reference object to be positioned within the field of view of the image capture component;
selecting an initialization path for the graphical element, the initialization path including one or more position changes of the image capture component relative to the reference object;
generating movement of the graphical element across the display corresponding to the initialization path; and
identifying the position of the image capture component relative to the object, the reference geometry, and the reference object.

4. The method of claim 2, wherein the identifying of at least some surfaces of the object further comprises:
identifying within the scene a surface corresponding to the reference geometry and at least some surfaces of the object; and
isolating the identified surfaces of the object from the surface of the reference geometry.

5. The method of claim 2, further comprising:
selecting an atlas corresponding to the object, based on the identified surfaces of the object; and
positioning the atlas substantially within the identified surfaces.

6. The method of claim 5, wherein the constructing of the three-dimensional model further comprises:
identifying a set of landmark points on the atlas;
determining a set of points on the object corresponding to the set of landmark points; and
generating a modified atlas by fitting the atlas to at least a portion of the set of landmark points on the object, the modified atlas maintaining a proportion of two or more dimensions extending between landmark points of the atlas.

7. The method of claim 1, wherein dynamically modifying of the displayed image further comprises:
detecting surface regions of the object as the image capture component moves in accordance with the trajectory; and
for at least some detected surface regions, iteratively modifying the displayed image at a location on the object corresponding to the surface region most recently detected.

8. The method of claim 1, wherein the providing on the display of a suggested movement of the image capture component comprises:
generating on the displayed image a graphical representation of the suggested movement in accordance with the trajectory, the graphical representation including representations of one or more directions and one or more movement speeds for moving the image capture component relative to the object, the one or more directions forming at least a portion of the trajectory; and
causing presentation of the graphical representation within the display.

9. The method of claim 1, wherein the modifying of the graphical depiction of the portion of the object further comprises:
identifying portions of the object associated with surfaces as the surfaces are being detected;
modifying a graphical representation of the object displayed on the display such that, as each surface is detected, a portion of the graphical representation of the object proximate to the detected surface is modified by an element; and
for each detected surface, storing data representing the detected surface and the element modifying the portion of the graphical representation of the object proximate to the surface within a processor-readable storage medium.

10. A system, comprising:
one or more processors; and
a non-transitory processor-readable storage device having an image capture component and a display coupled to the one or more processors, the non-transitory processor-readable storage device storing processor-executable instructions that, when executed by the one or more processors, cause the one or more processors to perform operations comprising:
initiating, by the one or more processors of the device, an object modeling mode configured to capture sufficient views of an object within the field of view of the image capture component to enable generation of a three-dimensional model of the object;
responsive to input from the image capture component, automatically selecting, by the one or more processors, a trajectory for the image capture component relative to the object;
providing, on the display, an image generally representative of the object and augmenting the image with a suggested movement of the image capture device in accordance with the trajectory;
as the image capture component is moved relative to the object, automatically capturing a data stream representative of a series of views of the object;
in response to at least a portion of the data stream, dynamically modifying, modifying the displayed image and augmenting the displayed image to guide a next movement of the image capture component
and
repeating the automatic capturing step and the dynamically modifying step until the data stream comprises sufficient views of the object that a three-dimensional model of the object can be generated from at least some of the captured views.

11. The system of claim 10 wherein the non-transitory processor-readable storage device causes the one or more processors to perform operations further comprising:
responsive to the initiating of the object detection mode, identifying in a scene within the field of view of the image capture component at least some surfaces of the object and a reference geometry positioned proximate to the object;
identifying within the scene a surface corresponding to the reference geometry and at least some surfaces of the object;
isolating at least some of the surfaces of the object from the surface of the reference geometry; and
identifying a position of the image capture component relative to the object and the reference geometry.

12. The system of claim 11, wherein the non-transitory processor-readable storage device causes the one or more processors to perform operations further comprising:
responsive to the initiating of the object detection mode, generating a graphical element for a reference object to be positioned within the field of view of the image capture component;

selecting an initialization path for the graphical element, the initialization path including one or more position changes of the image capture component relative to the reference object;
generating movement of the graphical element across the display corresponding to the initialization path; and
identifying the position of the image capture component relative to the object, the reference geometry, and the reference object.

13. The system of claim 11, wherein the operations further comprise:
selecting an atlas corresponding to the object, based on the identified surfaces of the object;
positioning the atlas substantially within the identified surfaces;
identifying a set of landmark points on the atlas;
determining a set of points on the object corresponding to the set of landmark points; and
generating a modified atlas by fitting the atlas to at least a portion of the set of landmark points on the object, the modified atlas maintaining a proportion of two or more dimensions extending between landmark points of the atlas.

14. The system of claim 10, wherein the dynamically modifying of the displayed image further comprises:
identifying portions of the object associated with surfaces as the surfaces are being detected;
modifying a graphical representation of the object displayed on a display such that, as each surface is detected, a portion of the graphical representation of the object proximate to the detected surface is modified by an augmentation element; and
for each detected surface, storing data representing the detected surface and the augmentation element modifying the portion of the graphical representation of the object proximate to the surface within a processor-readable storage medium.

15. A non-transitory processor-readable storage device storing processor-executable instructions that, when executed by one or more processors of a machine, cause the machine to perform operations comprising:
initiating, by the one or more processors, an object modeling mode configured to capture successive images comprising sufficient views of an object at least partly within the field of view of an image capture component to enable generation of a three-dimensional model of the object;
isolating from the remainder of the field of view, by the one or more processors, the object;
responsive to images captured by the image capture component, automatically selecting, by the one or more processors, a first path for the image capture component relative to the object, the first path being selected based on the position of the object within the field of view;
providing, on a display associated with the image capture component, a graphical depiction of at least part of the object;
augmenting the graphical depiction on the display with at least one suggested movement of the image capture component along the first path;
responsive to position changes of the image capture component relative to the object in performing the at least one suggested movement along the path, automatically capturing successive images that comprise one or more views of the object;
in response to the automatic capturing step, the graphical depiction of the object corresponding to one or more of the captured successive images;
in response to the automatic capturing step dynamically augmenting the graphical depiction with at least a further one suggested movement for the image capture component relative to the object;
and
repeating the automatic capturing step, the dynamically modifying step, and the dynamically augmenting step until the data stream comprises sufficient views of the object that a three-dimensional model of the object can be generated from at least some of the captured views.

16. The non-transitory processor-readable storage device of claim 15, wherein the operations further comprise:
responsive to the initiating of the object detection mode, identifying in a scene within the field of view of the image capture component, at least some surfaces of the object and at least one surface of a reference geometry positioned proximate to the object;
as part of the isolating step, isolating the identified surfaces of the object from the at least one surface of the reference geometry; and
identifying a position and orientation of the image capture component relative to the object and the reference geometry.

17. The non-transitory processor-readable storage device of claim 16, wherein the operations further comprise:
responsive to the initiating of the object detection mode, generating in the display a graphical element for the reference geometry positioned within the field of view of the image capture component;
selecting an initialization path for the graphical element, the initialization path including one or more position changes of the image capture component relative to the reference geometry; and
generating movement of the graphical element across the display corresponding to the initialization path.

18. The non-transitory processor-readable storage device of claim 16, wherein the operations further comprise:
selecting an atlas corresponding to the object, based on identified surfaces;
positioning the atlas within the set of surfaces;
identifying a set of landmark points on the atlas;
determining a set of points on the object corresponding to the set of landmark points; and
generating a modified atlas by fitting the atlas to at least a portion of the set of points, the modified atlas maintaining a proportion of two or more dimensions extending between landmark points of the atlas.

19. The non-transitory processor-readable storage device of claim 16, wherein the modifying of the graphical depiction of the portion of the object further comprises:
as part of the surface identifying step, identifying portions of the object associated with surfaces as the surfaces are being detected;
as part of the dynamically modifying step, modifying the graphical depiction of the object on the display such that, as each surface is detected, a portion of the object proximate to the detected surface is modified by an element; and
for each identified surface, storing within a processor-readable storage medium data representing the identified surface and the element modifying the portion of the object proximate to the surface.

20. The method of claim 1 wherein the image provided on the display is a graphical depiction.

\* \* \* \* \*